US012454553B2

(12) United States Patent
Swanson et al.

(10) Patent No.: US 12,454,553 B2
(45) Date of Patent: Oct. 28, 2025

(54) ANTIGENIC MULTIMERIC RESPIRATORY SYNCYTIAL VIRUS POLYPEPTIDES

(71) Applicant: Sanofi, Paris (FR)

(72) Inventors: Kurt Swanson, Bridgewater, NJ (US); Chih-Jen Wei, Bridgewater, NJ (US); Gary J. Nabel, Bridgewater, NJ (US)

(73) Assignee: Sanofi, Paris (FR)

( * ) Notice: Subject to any disclaimer, the term of this patent is extended or adjusted under 35 U.S.C. 154(b) by 1065 days.

(21) Appl. No.: 17/489,249

(22) Filed: Sep. 29, 2021

(65) Prior Publication Data

US 2022/0119457 A1 Apr. 21, 2022

Related U.S. Application Data

(63) Continuation of application No. PCT/US2020/026198, filed on Apr. 1, 2020.

(60) Provisional application No. 62/828,302, filed on Apr. 2, 2019.

(51) Int. Cl.
*C07K 14/005* (2006.01)
*A61K 39/00* (2006.01)
*A61K 39/155* (2006.01)
*A61P 31/14* (2006.01)
*C12N 7/00* (2006.01)

(52) U.S. Cl.
CPC .......... *C07K 14/005* (2013.01); *A61K 39/155* (2013.01); *A61P 31/14* (2018.01); *C12N 7/00* (2013.01); *A61K 2039/64* (2013.01); *A61K 2039/70* (2013.01); *C12N 2760/18522* (2013.01); *C12N 2760/18534* (2013.01); *C12N 2760/18571* (2013.01)

(58) Field of Classification Search
None
See application file for complete search history.

(56) References Cited

U.S. PATENT DOCUMENTS

| | | | |
|---|---|---|---|
| 6,077,511 A | 6/2000 | Langedijk | |
| 6,194,388 B1 | 2/2001 | Krieg et al. | |
| 6,207,646 B1 | 3/2001 | Krieg et al. | |
| 6,214,806 B1 | 4/2001 | Krieg et al. | |
| 6,218,371 B1 | 4/2001 | Krieg et al. | |
| 6,239,116 B1 | 5/2001 | Krieg et al. | |
| 6,339,068 B1 | 1/2002 | Krieg et al. | |
| 6,406,705 B1 | 6/2002 | Davis et al. | |
| 6,429,199 B1 | 8/2002 | Krieg et al. | |
| 9,703,095 B2 | 7/2017 | Pakhchyan | |
| 2018/0110850 A1* | 4/2018 | Khurana | G01N 33/56983 |
| 2018/0271970 A1* | 9/2018 | Ciaramella | A61K 31/7115 |

FOREIGN PATENT DOCUMENTS

| | | | | |
|---|---|---|---|---|
| CN | 107029227 A | 8/2017 | | |
| CN | 114269373 A | 4/2022 | | |
| JP | 2000512136 A | 9/2000 | | |
| WO | 9746581 A1 | 12/1997 | | |
| WO | WO-2009038270 A1 * | 3/2009 | ............ | A61K 39/12 |
| WO | 2010075491 A2 | 7/2010 | | |
| WO | 2014140083 A1 | 9/2014 | | |
| WO | 2017218819 A1 | 12/2017 | | |
| WO | 2018154010 A1 | 8/2018 | | |
| WO | 2019032480 A1 | 2/2019 | | |
| WO | 2019055768 A1 | 3/2019 | | |
| WO | 2019195316 A1 | 10/2019 | | |
| WO | 2020205986 A1 | 10/2020 | | |

OTHER PUBLICATIONS

Choi, Y. et al., "Antibodies to the Central Conserved Region of Respiratory Syncytial Virus (RSV) G Protein Block Rsv G Protein CX3C-CX3CR1 Binding and Cross-Neutralize RSV A and B Strains", Viral Immunology, May 2, 2012, 25(3): 193-203.
Falloon et al., "An Adjuvanted, Postfusion F Protein-Based Vaccine Did Not Prevent Respiratory Syncytial Virus Ilness in Older Adults", J Infect Dis. 216(11): 1362-1370 (Dec. 1, 2017).
Hurwitz, J., "Respiratory syncytial virus vaccine development", Expert Rev Vaccines, 10(10): 1415-1433 (2011).
International Preliminary Report on Patentability in corresponding International Application No. PCT/US2020/026198, Issued Sep. 28, 2021 (7 pages).
International Search Report in corresponding International Application No. PCT/US2020/026198, issued Jun. 22, 2020, 4 pages.
Jones, H. et al., "Structural basis for recognition of the central conserved region of RSV G by neutralizing human antibodies", PLOS Pathogens, Jan. 1, 2018, 14(3): e1006935.
Jorquera, P., et al., "Nanoparticle Vaccines Encompassing the Respiratory Syncytial Virus (RSV) G Protein CX3C Chemokine Motif Induce Robust Immunity Protecting from Challenge and Disease", PLOS One, Sep. 10, 2013, 8(9): e74905.
Kanekiyo et al., "Self-Assembling Influenza Nanoparticle Vaccines Elicit Broadly Neutralizing H1N1 Antibodies", Nature, 499(7456):102-106 (2013).
Klucker et al., "AF03, an alternative squalene emulsion-based vaccine adjuvant prepared by a phase inversion temperature method", J Pharm Sci., 101(12):4490-500 (Dec. 2012).
Pearson et al., "Improved tools for biological sequence comparison", Proc. Natl Acad. Sci. USA, 88: 2444-2448 (Apr. 1988).
Smith et al., "Comparison of Biosequences", Advances in Applied Mathematics, 2: 482-489 (1981).
Written Opinion in corresponding International Application No. PCT/US2020/026198, issued Jun. 22, 2020, 6 pages.
Hua et al., "DNA vaccine encoding central conserved region of G protein induces Th1 predominant immune response and protection from RSV infection in mice", Immunology Letters, 179:95-101 (2016).
Song Yingli et al., "Advances in the study of respiratory syncytial virus G protein", Chinese Journal of Biologicals, 21(06):534-536 (Jun. 20, 2008) (with English translation of Abstract).

(Continued)

*Primary Examiner* — Daniel E Kolker
*Assistant Examiner* — Peter Johansen
(74) *Attorney, Agent, or Firm* — McNeill PLLC

(57) ABSTRACT

This disclosure relates to antigenic multimeric respiratory syncytial virus (RSV) G polypeptides for use in eliciting an immune response to RSV.

15 Claims, 7 Drawing Sheets

Specification includes a Sequence Listing.

(56) References Cited

OTHER PUBLICATIONS

Lee et al., "Universal vaccine against respiratory syncytial virus A and B subtypes", PLOS One, 12(4):e0175384 (2017) (19 pages).
Sugawara et al., "Structure-antigenicity relationship studies of the central conserved region of human respiratory syncytial virus protein G", The Journal of Peptide Research, 60(05): 271-282 (Nov. 30, 2002).

* cited by examiner

Figure 1A

Structural Model of RSV Gcc-NP

Figure 1B

Gcc B1-A2-foldon

| RSV Gcc (B1) | RSV Gcc (A2) | Foldon |

Figure 2A

Gcc Tetramer

| RSV Gcc (A2) | RSV Gcc (B1) | RSV Gcc (A2) | RSV Gcc (B1) |

Figure 2B

| RSV Gcc (A2) | α particle protomer | RSV Gcc (B1) |

Figure 2C

SEQUENCE LISTING

```
<160> NUMBER OF SEQ ID NOS: 226

<210> SEQ ID NO 1
<211> LENGTH: 297
<212> TYPE: PRT
<213> ORGANISM: Human respiratory syncytial virus A
<220> FEATURE:
<221> NAME/KEY: misc_feature
<222> LOCATION: (1)..(297)
<223> OTHER INFORMATION: RSV G A strain Native

<400> SEQUENCE: 1

Met Ser Lys Asn Lys Asp Gln Arg Thr Ala Lys Thr Leu Glu Arg Thr
1               5                  10                  15

Trp Asp Thr Leu Asn His Leu Leu Phe Ile Ser Ser Cys Leu Tyr Lys
            20                  25                  30

Leu Asn Leu Lys Ser Val Ala Gln Ile Thr Leu Ser Ile Leu Ala Met
        35                  40                  45

Ile Ile Ser Thr Ser Leu Ile Ile Val Ala Ile Ile Phe Ile Ala Ser
    50                  55                  60

Ala Asn His Lys Ile Thr Ser Thr Thr Thr Ile Ile Gln Asp Ala Thr
65                  70                  75                  80

Asn Gln Ile Lys Asn Thr Thr Pro Thr Tyr Leu Thr Gln Asn Pro Gln
                85                  90                  95

Leu Gly Ile Ser Pro Ser Asn Pro Ser Asp Ile Thr Ser Leu Ile Thr
            100                 105                 110

Thr Ile Leu Asp Ser Thr Thr Pro Gly Val Lys Ser Thr Leu Gln Ser
        115                 120                 125

Thr Thr Val Gly Thr Lys Asn Thr Thr Thr Gln Ala Gln Pro Asn
    130                 135                 140

Lys Pro Thr Thr Lys Gln Arg Gln Asn Lys Pro Pro Ser Lys Pro Asn
145                 150                 155                 160

Asn Asp Phe His Phe Glu Val Phe Asn Phe Val Pro Cys Ser Ile Cys
                165                 170                 175

Ser Asn Asn Pro Thr Cys Trp Ala Ile Cys Lys Arg Ile Pro Asn Lys
            180                 185                 190

Lys Pro Gly Lys Arg Thr Thr Thr Lys Pro Thr Lys Lys Pro Thr Pro
        195                 200                 205

Lys Thr Thr Lys Lys Gly Pro Lys Pro Gln Thr Thr Lys Ser Lys Glu
    210                 215                 220

Ala Pro Thr Thr Lys Pro Thr Glu Glu Pro Thr Ile Asn Thr Thr Lys
225                 230                 235                 240

Thr Asn Ile Ile Thr Thr Leu Leu Thr Ser Asn Thr Thr Arg Asn Pro
                245                 250                 255
```

Glu Leu Thr Ser Gln Met Glu Thr Phe His Ser Thr Ser Glu Gly
            260                 265                 270

Asn Pro Ser Pro Ser Gln Val Ser Ile Thr Ser Glu Tyr Pro Ser Gln
            275                 280                 285

Pro Ser Ser Pro Pro Asn Thr Pro Arg
    290                 295

<210> SEQ ID NO 2
<211> LENGTH: 233
<212> TYPE: PRT
<213> ORGANISM: Human respiratory syncytial virus A
<220> FEATURE:
<221> NAME/KEY: misc_feature
<222> LOCATION: (1)..(233)
<223> OTHER INFORMATION: RSV G ectodomain, residues 66-297

<400> SEQUENCE: 2

Asn His Lys Val Thr Leu Thr Thr Ala Ile Ile Gln Asp Ala Thr Ser
1               5                   10                  15

Gln Ile Lys Asn Thr Thr Pro Thr Tyr Leu Thr Gln Asp Pro Gln Leu
            20                  25                  30

Gly Ile Ser Phe Ser Asn Leu Ser Glu Ile Thr Ser Gln Thr Thr Thr
        35                  40                  45

Ile Leu Ala Ser Thr Thr Pro Gly Val Lys Ser Asn Leu Gln Pro Thr
    50                  55                  60

Thr Val Lys Thr Lys Asn Thr Thr Thr Thr Gln Thr Gln Pro Ser Lys
65                  70                  75                  80

Pro Thr Thr Lys Gln Arg Gln Asn Lys Pro Pro Asn Lys Pro Asn Asn
                85                  90                  95

Asp Phe His Phe Glu Val Phe Asn Phe Val Pro Cys Ser Ile Cys Ser
            100                 105                 110

Asn Asn Pro Thr Cys Trp Ala Ile Cys Lys Arg Ile Pro Asn Lys Lys
        115                 120                 125

Pro Gly Lys Lys Thr Thr Thr Lys Pro Thr Lys Lys Pro Thr Phe Lys
    130                 135                 140

Thr Thr Lys Lys Asp His Lys Pro Gln Thr Thr Lys Pro Lys Glu Val
145                 150                 155                 160

Pro Thr Thr Lys Pro Thr Glu Glu Pro Thr Ile Asn Thr Thr Lys Thr
                165                 170                 175

Asn Ile Ile Thr Thr Leu Leu Thr Asn Asn Thr Thr Gly Asn Pro Lys
            180                 185                 190

Leu Thr Ser Gln Met Glu Thr Phe His Ser Thr Ser Ser Glu Gly Asn
        195                 200                 205

Leu Ser Pro Ser Gln Val Ser Thr Thr Ser Glu His Pro Ser Gln Pro
    210                 215                 220

Ser Ser Pro Pro Asn Thr Thr Arg Gln
225                 230

<210> SEQ ID NO 3
<211> LENGTH: 43
<212> TYPE: PRT
<213> ORGANISM: Human respiratory syncytial virus A
<220> FEATURE:
<221> NAME/KEY: misc_feature
<222> LOCATION: (1)..(43)
<223> OTHER INFORMATION: RSV Gcc (central conserved region) A2 strain
      res 151-193. As described in Murata et al. (2010) Vaccine 28:6242-
      6246 at Fig. 1.

<400> SEQUENCE: 3

Arg Gln Asn Lys Pro Pro Asn Lys Pro Asn Asn Asp Phe His Phe Glu
1               5                   10                  15

Val Phe Asn Phe Val Pro Cys Ser Ile Cys Ser Asn Asn Pro Thr Cys
            20                  25                  30

Trp Ala Ile Cys Lys Arg Ile Pro Asn Lys Lys
            35                  40

<210> SEQ ID NO 4
<211> LENGTH: 180
<212> TYPE: PRT
<213> ORGANISM: Artificial Sequence
<220> FEATURE:
<223> OTHER INFORMATION: Synthetic: RSV Gcc B1-A2-foldon strain chimera
      sequence

<400> SEQUENCE: 4

Met Glu Glu Ser Glu Glu Ser Gly Gly Arg Lys Asn Pro Pro Lys Lys
1               5                   10                  15

Pro Lys Asp Asp Tyr His Phe Glu Val Phe Asn Phe Val Pro Cys Ser
            20                  25                  30

Ile Cys Gly Asn Asn Gln Leu Cys Lys Ser Ile Cys Lys Thr Ile Pro
            35                  40                  45

Asn Lys Lys Glu Glu Glu Glu Ser Glu Glu Ser Gly Gly Arg Gln
50                  55                  60

Asn Lys Pro Pro Ser Lys Pro Asn Asn Asp Phe His Phe Glu Val Phe
65                  70                  75                  80

Asn Phe Val Pro Cys Ser Ile Cys Ser Asn Asn Pro Thr Cys Trp Ala
            85                  90                  95

Ile Cys Lys Arg Ile Pro Asn Lys Lys Glu Glu Glu Ser Ser Gly Gly
            100                 105                 110

Ser Gly Gly Gly Gly Ser Gly Gly Gly Ser Gly Gly Gly Gly Ser
        115                 120                 125

Gly Ser Ser Ala Ile Gly Gly Tyr Ile Pro Glu Ala Pro Arg Asp Gly
130                 135                 140

Gln Ala Tyr Val Arg Lys Asp Gly Glu Trp Val Leu Leu Ser Thr Phe
145                 150                 155                 160

Leu Gly Ser Gly Leu Glu Val Leu Phe Gln Gly Pro Leu Glu His His
                165                 170                 175

His His His His
        180

<210> SEQ ID NO 5
<211> LENGTH: 169
<212> TYPE: PRT
<213> ORGANISM: Artificial Sequence
<220> FEATURE:
<223> OTHER INFORMATION: Synthetic: RSV Gcc tetramer, A2-B1-A2-B1 strain
      chimera

<400> SEQUENCE: 5

Met Arg Gln Asn Lys Pro Pro Ser Lys Pro Asn Asn Asp Phe His Phe
1               5                   10                  15

Glu Val Phe Asn Phe Val Pro Cys Ser Ile Cys Ser Asn Asn Pro Thr
            20                  25                  30

Cys Trp Ala Ile Cys Lys Arg Ile Pro Asn Lys Arg Lys Asn Pro Pro
            35                  40                  45

Lys Lys Pro Lys Asp Asp Tyr His Phe Glu Val Phe Asn Phe Val Pro

```
                    50                  55                  60
Cys Ser Ile Cys Gly Asn Asn Gln Leu Cys Lys Ser Ile Cys Lys Thr
 65                  70                  75                  80

Ile Pro Asn Lys Lys Arg Gln Asn Lys Pro Pro Ser Lys Pro Asn Asn
                 85                  90                  95

Asp Phe His Phe Glu Val Phe Asn Phe Val Pro Cys Ser Ile Cys Ser
            100                 105                 110

Asn Asn Pro Thr Cys Trp Ala Ile Cys Lys Arg Ile Pro Asn Lys Arg
        115                 120                 125

Lys Asn Pro Pro Lys Pro Lys Asp Asp Tyr His Phe Glu Val Phe
    130                 135                 140

Asn Phe Val Pro Cys Ser Ile Cys Gly Asn Asn Gln Leu Cys Lys Ser
145                 150                 155                 160

Ile Cys Lys Thr Ile Pro Asn Lys Lys
                165

<210> SEQ ID NO 6
<211> LENGTH: 213
<212> TYPE: PRT
<213> ORGANISM: Artificial Sequence
<220> FEATURE:
<223> OTHER INFORMATION: Synthetic: RSV Gcc A2-?-B1 chimera particle

<400> SEQUENCE: 6

Met Glu Glu Ser Glu Glu Ser Gly Gly Arg Gln Asn Lys Pro Pro Ser
 1               5                  10                  15

Lys Pro Asn Asn Asp Phe His Phe Glu Val Phe Asn Phe Val Pro Cys
                20                  25                  30

Ser Ile Cys Ser Asn Asn Pro Thr Cys Trp Ala Ile Cys Lys Arg Ile
            35                  40                  45

Pro Asn Lys Glu Glu Glu Glu Ser Glu Glu Ser Gly Gly Ser Gly
        50                  55                  60

Ser Trp Glu Glu Trp Asn Ala Lys Trp Asp Glu Trp Arg Asn Asp Gln
 65                  70                  75                  80

Asn Asp Trp Arg Glu Asp Trp Gln Ala Trp Arg Asp Asp Trp Ala Tyr
                85                  90                  95

Trp Thr Leu Thr Trp Arg Tyr Gly Glu Leu Tyr Ser Arg Leu Ala Arg
            100                 105                 110

Ile Glu Arg Arg Val Glu Glu Leu Arg Arg Leu Leu Gln Leu Ile Arg
        115                 120                 125

His Glu Asn Arg Met Val Leu Gln Phe Val Arg Ala Leu Ser Met Gln
    130                 135                 140

Ala Arg Arg Leu Glu Ser Lys Leu Glu Glu Glu Glu Ser Glu Glu
145                 150                 155                 160

Ser Gly Gly Arg Lys Asn Pro Pro Lys Pro Lys Asp Asp Tyr His
                165                 170                 175

Phe Glu Val Phe Asn Phe Val Pro Cys Ser Ile Cys Gly Asn Asn Gln
            180                 185                 190

Leu Cys Lys Ser Ile Cys Lys Thr Ile Pro Asn Lys Lys Glu Glu Ser
        195                 200                 205

Glu Glu Ser Gly Gly
    210

<210> SEQ ID NO 7
<211> LENGTH: 181
<212> TYPE: PRT
```

<213> ORGANISM: Artificial Sequence
<220> FEATURE:
<223> OTHER INFORMATION: Synthetic: RSV Gcc A2-A2-foldon strain chimera sequence

<400> SEQUENCE: 7

```
Met Glu Ser Glu Ser Gly Gly Arg Gln Asn Lys Pro Pro Ser
1               5                   10                  15

Lys Pro Asn Asn Asp Phe His Phe Glu Val Phe Asn Phe Val Pro Cys
            20                  25                  30

Ser Ile Cys Ser Asn Asn Pro Thr Cys Trp Ala Ile Cys Lys Arg Ile
        35                  40                  45

Pro Asn Lys Lys Glu Glu Glu Glu Ser Glu Glu Ser Gly Gly Arg
50                  55                  60

Gln Asn Lys Pro Pro Ser Lys Pro Asn Asn Asp Phe His Phe Glu Val
65                  70                  75                  80

Phe Asn Phe Val Pro Cys Ser Ile Cys Ser Asn Asn Pro Thr Cys Trp
                85                  90                  95

Ala Ile Cys Lys Arg Ile Pro Asn Lys Lys Glu Glu Glu Ser Ser Gly
                100                 105                 110

Gly Ser Gly Gly Gly Gly Ser Gly Gly Gly Ser Gly Gly Gly Gly
            115                 120                 125

Ser Gly Ser Ser Ala Ile Gly Gly Tyr Ile Pro Glu Ala Pro Arg Asp
130                 135                 140

Gly Gln Ala Tyr Val Arg Lys Asp Gly Glu Trp Val Leu Leu Ser Thr
145                 150                 155                 160

Phe Leu Gly Ser Gly Leu Glu Val Leu Phe Gln Gly Pro Leu Glu His
                165                 170                 175

His His His His His
            180
```

<210> SEQ ID NO 8
<211> LENGTH: 179
<212> TYPE: PRT
<213> ORGANISM: Artificial Sequence
<220> FEATURE:
<223> OTHER INFORMATION: Synthetic: RSV Gcc B1-B1-foldon strain chimera sequence

<400> SEQUENCE: 8

```
Met Glu Glu Ser Glu Glu Ser Gly Gly Arg Lys Asn Pro Pro Lys Lys
1               5                   10                  15

Pro Lys Asp Asp Tyr His Phe Glu Val Phe Asn Phe Val Pro Cys Ser
            20                  25                  30

Ile Cys Gly Asn Asn Gln Leu Cys Lys Ser Ile Cys Lys Thr Ile Pro
        35                  40                  45

Asn Lys Lys Glu Glu Glu Glu Ser Glu Glu Ser Gly Gly Arg Lys
50                  55                  60

Asn Pro Pro Lys Lys Pro Lys Asp Asp Tyr His Phe Glu Val Phe Asn
65                  70                  75                  80

Phe Val Pro Cys Ser Ile Cys Gly Asn Asn Gln Leu Cys Lys Ser Ile
                85                  90                  95

Cys Lys Thr Ile Pro Asn Lys Lys Glu Glu Glu Ser Ser Gly Gly Ser
                100                 105                 110

Gly Gly Gly Gly Ser Gly Gly Gly Ser Gly Gly Gly Gly Ser Gly
            115                 120                 125

Ser Ser Ala Ile Gly Gly Tyr Ile Pro Glu Ala Pro Arg Asp Gly Gln
```

```
                130                 135                 140

Ala Tyr Val Arg Lys Asp Gly Glu Trp Val Leu Leu Ser Thr Phe Leu
145                 150                 155                 160

Gly Ser Gly Leu Glu Val Leu Phe Gln Gly Pro Leu Glu His His His
                165                 170                 175

His His His

<210> SEQ ID NO 9
<211> LENGTH: 74
<212> TYPE: PRT
<213> ORGANISM: Artificial Sequence
<220> FEATURE:
<223> OTHER INFORMATION: Synthetic: alpha- sequence

<400> SEQUENCE: 9

Asp Glu Trp Arg Asn Asp Gln Asn Asp Trp Arg Glu Asp Trp Gln Ala
1               5                   10                  15

Trp Arg Asp Asp Trp Ala Tyr Trp Thr Leu Thr Trp Arg Tyr Gly Glu
                20                  25                  30

Leu Tyr Ser Arg Leu Ala Arg Ile Glu Arg Arg Val Glu Glu Leu Arg
            35                  40                  45

Arg Leu Leu Gln Leu Ile Arg His Glu Asn Arg Met Val Leu Gln Phe
    50                  55                  60

Val Arg Ala Leu Ser Met Gln Ala Arg Arg
65                  70

<210> SEQ ID NO 10
<211> LENGTH: 40
<212> TYPE: PRT
<213> ORGANISM: Human respiratory syncytial virus B
<220> FEATURE:
<221> NAME/KEY: misc_feature
<222> LOCATION: (1)..(40)
<223> OTHER INFORMATION: RSV Gcc (central conserved region) B1 strain
      res 151-193. As described in Murata et al. (2010) Vaccine 28:6242-
      6246 at Fig. 1.

<400> SEQUENCE: 10

Arg Leu Lys Asn Pro Pro Lys Lys Pro Lys Asp Asp Tyr His Phe Glu
1               5                   10                  15

Val Phe Asn Phe Val Pro Cys Ser Ile Cys Gly Asn Asn Gln Leu Cys
                20                  25                  30

Lys Ser Ile Cys Lys Thr Ile Pro
            35                  40

<210> SEQ ID NO 11
<211> LENGTH: 43
<212> TYPE: PRT
<213> ORGANISM: Artificial Sequence
<220> FEATURE:
<223> OTHER INFORMATION: Synthetic: Foldon

<400> SEQUENCE: 11

Ala Ile Gly Gly Tyr Ile Pro Glu Ala Pro Arg Asp Gly Gln Ala Tyr
1               5                   10                  15

Val Arg Lys Asp Gly Glu Trp Val Leu Leu Ser Thr Phe Leu Gly Ser
                20                  25                  30

Gly Leu Glu Val Leu Phe Gln Gly Pro Leu Glu
            35                  40

<210> SEQ ID NO 12
```

```
<211> LENGTH: 60
<212> TYPE: PRT
<213> ORGANISM: Artificial Sequence
<220> FEATURE:
<223> OTHER INFORMATION: Synthetic: RSV G peptide A2 (aa 151-193) for
      conjugation with N-terminal Azido linker and flanking glutamates
<220> FEATURE:
<221> NAME/KEY: MOD_RES
<222> LOCATION: (1)..(1)
<223> OTHER INFORMATION: Azido-PEG4 at 5' end

<400> SEQUENCE: 12

Ser Gly Gly Ser Ser Gly Ser Ser Glu Glu Glu Gly Ser Arg Gln
1               5                   10                  15

Asn Lys Pro Pro Asn Lys Pro Asn Asn Asp Phe His Phe Glu Val Phe
            20                  25                  30

Asn Phe Val Pro Cys Ser Ile Cys Ser Asn Asn Pro Thr Cys Trp Ala
        35                  40                  45

Ile Cys Lys Arg Ile Pro Asn Lys Lys Glu Glu Glu
    50                  55                  60

<210> SEQ ID NO 13
<211> LENGTH: 30
<212> TYPE: PRT
<213> ORGANISM: Artificial Sequence
<220> FEATURE:
<223> OTHER INFORMATION: Synthetic: 30 amino acid foldon

<400> SEQUENCE: 13

Ala Ile Gly Gly Tyr Ile Pro Glu Ala Pro Arg Asp Gly Gln Ala Tyr
1               5                   10                  15

Val Arg Lys Asp Gly Glu Trp Val Leu Leu Ser Thr Phe Leu
            20                  25                  30

<210> SEQ ID NO 14
<211> LENGTH: 161
<212> TYPE: PRT
<213> ORGANISM: Artificial Sequence
<220> FEATURE:
<223> OTHER INFORMATION: Synthetic: RSV Gcc B1-A2-30 aa foldon strain
      chimera sequence

<400> SEQUENCE: 14

Met Glu Glu Ser Glu Glu Ser Gly Gly Arg Lys Asn Pro Pro Lys Lys
1               5                   10                  15

Pro Lys Asp Asp Tyr His Phe Glu Val Phe Asn Phe Val Pro Cys Ser
            20                  25                  30

Ile Cys Gly Asn Asn Gln Leu Cys Lys Ser Ile Cys Lys Thr Ile Pro
        35                  40                  45

Asn Lys Lys Glu Glu Glu Glu Ser Glu Glu Ser Gly Gly Arg Gln
    50                  55                  60

Asn Lys Pro Pro Ser Lys Pro Asn Asn Asp Phe His Phe Glu Val Phe
65                  70                  75                  80

Asn Phe Val Pro Cys Ser Ile Cys Ser Asn Asn Pro Thr Cys Trp Ala
            85                  90                  95

Ile Cys Lys Arg Ile Pro Asn Lys Lys Glu Glu Glu Ser Ser Gly Gly
            100                 105                 110

Ser Gly Gly Gly Gly Ser Gly Gly Gly Ser Gly Gly Gly Gly Ser
        115                 120                 125

Gly Ser Ser Ala Ile Gly Gly Tyr Ile Pro Glu Ala Pro Arg Asp Gly
    130                 135                 140
```

```
Gln Ala Tyr Val Arg Lys Asp Gly Glu Trp Val Leu Leu Ser Thr Phe
145                 150                 155                 160

Leu

<210> SEQ ID NO 15
<211> LENGTH: 4
<212> TYPE: PRT
<213> ORGANISM: Artificial Sequence
<220> FEATURE:
<223> OTHER INFORMATION: Synthetic: linker

<400> SEQUENCE: 15

Gly Gly Gly Ser
1

<210> SEQ ID NO 16
<211> LENGTH: 8
<212> TYPE: PRT
<213> ORGANISM: Artificial Sequence
<220> FEATURE:
<223> OTHER INFORMATION: Synthetic: linker

<400> SEQUENCE: 16

Gly Gly Gly Ser Gly Gly Gly Ser
1               5

<210> SEQ ID NO 17
<211> LENGTH: 20
<212> TYPE: PRT
<213> ORGANISM: Artificial Sequence
<220> FEATURE:
<223> OTHER INFORMATION: Synthetic: linker

<400> SEQUENCE: 17

Gly Gly Gly Ser Gly Gly Gly Ser Gly Gly Gly Ser Gly Gly Gly Ser
1               5                   10                  15

Gly Gly Gly Ser
            20

<210> SEQ ID NO 18

<400> SEQUENCE: 18

000

<210> SEQ ID NO 19

<400> SEQUENCE: 19

000

<210> SEQ ID NO 20

<400> SEQUENCE: 20

000

<210> SEQ ID NO 21

<400> SEQUENCE: 21

000

<210> SEQ ID NO 22

<400> SEQUENCE: 22
```

000

<210> SEQ ID NO 23

<400> SEQUENCE: 23

000

<210> SEQ ID NO 24

<400> SEQUENCE: 24

000

<210> SEQ ID NO 25

<400> SEQUENCE: 25

000

<210> SEQ ID NO 26

<400> SEQUENCE: 26

000

<210> SEQ ID NO 27

<400> SEQUENCE: 27

000

<210> SEQ ID NO 28

<400> SEQUENCE: 28

000

<210> SEQ ID NO 29

<400> SEQUENCE: 29

000

<210> SEQ ID NO 30

<400> SEQUENCE: 30

000

<210> SEQ ID NO 31

<400> SEQUENCE: 31

000

<210> SEQ ID NO 32

<400> SEQUENCE: 32

000

<210> SEQ ID NO 33

<400> SEQUENCE: 33

000

<210> SEQ ID NO 34

<400> SEQUENCE: 34

000

<210> SEQ ID NO 35

<400> SEQUENCE: 35

000

<210> SEQ ID NO 36

<400> SEQUENCE: 36

000

<210> SEQ ID NO 37

<400> SEQUENCE: 37

000

<210> SEQ ID NO 38

<400> SEQUENCE: 38

000

<210> SEQ ID NO 39

<400> SEQUENCE: 39

000

<210> SEQ ID NO 40

<400> SEQUENCE: 40

000

<210> SEQ ID NO 41

<400> SEQUENCE: 41

000

<210> SEQ ID NO 42

<400> SEQUENCE: 42

000

<210> SEQ ID NO 43

<400> SEQUENCE: 43

000

<210> SEQ ID NO 44

<400> SEQUENCE: 44

000

```
<210> SEQ ID NO 45
<400> SEQUENCE: 45
000

<210> SEQ ID NO 46
<400> SEQUENCE: 46
000

<210> SEQ ID NO 47
<400> SEQUENCE: 47
000

<210> SEQ ID NO 48
<400> SEQUENCE: 48
000

<210> SEQ ID NO 49
<400> SEQUENCE: 49
000

<210> SEQ ID NO 50
<400> SEQUENCE: 50
000

<210> SEQ ID NO 51
<400> SEQUENCE: 51
000

<210> SEQ ID NO 52
<400> SEQUENCE: 52
000

<210> SEQ ID NO 53
<400> SEQUENCE: 53
000

<210> SEQ ID NO 54
<400> SEQUENCE: 54
000

<210> SEQ ID NO 55
<400> SEQUENCE: 55
000

<210> SEQ ID NO 56
```

```
<400> SEQUENCE: 56
000

<210> SEQ ID NO 57
<400> SEQUENCE: 57
000

<210> SEQ ID NO 58
<400> SEQUENCE: 58
000

<210> SEQ ID NO 59
<400> SEQUENCE: 59
000

<210> SEQ ID NO 60
<400> SEQUENCE: 60
000

<210> SEQ ID NO 61
<400> SEQUENCE: 61
000

<210> SEQ ID NO 62
<400> SEQUENCE: 62
000

<210> SEQ ID NO 63
<400> SEQUENCE: 63
000

<210> SEQ ID NO 64
<400> SEQUENCE: 64
000

<210> SEQ ID NO 65
<400> SEQUENCE: 65
000

<210> SEQ ID NO 66
<400> SEQUENCE: 66
000

<210> SEQ ID NO 67
<400> SEQUENCE: 67
```

000

<210> SEQ ID NO 68

<400> SEQUENCE: 68

000

<210> SEQ ID NO 69

<400> SEQUENCE: 69

000

<210> SEQ ID NO 70

<400> SEQUENCE: 70

000

<210> SEQ ID NO 71

<400> SEQUENCE: 71

000

<210> SEQ ID NO 72

<400> SEQUENCE: 72

000

<210> SEQ ID NO 73

<400> SEQUENCE: 73

000

<210> SEQ ID NO 74

<400> SEQUENCE: 74

000

<210> SEQ ID NO 75

<400> SEQUENCE: 75

000

<210> SEQ ID NO 76

<400> SEQUENCE: 76

000

<210> SEQ ID NO 77

<400> SEQUENCE: 77

000

<210> SEQ ID NO 78

<400> SEQUENCE: 78

000

<210> SEQ ID NO 79

<400> SEQUENCE: 79

000

<210> SEQ ID NO 80

<400> SEQUENCE: 80

000

<210> SEQ ID NO 81

<400> SEQUENCE: 81

000

<210> SEQ ID NO 82

<400> SEQUENCE: 82

000

<210> SEQ ID NO 83

<400> SEQUENCE: 83

000

<210> SEQ ID NO 84

<400> SEQUENCE: 84

000

<210> SEQ ID NO 85

<400> SEQUENCE: 85

000

<210> SEQ ID NO 86

<400> SEQUENCE: 86

000

<210> SEQ ID NO 87

<400> SEQUENCE: 87

000

<210> SEQ ID NO 88

<400> SEQUENCE: 88

000

<210> SEQ ID NO 89

<400> SEQUENCE: 89

000

<210> SEQ ID NO 90

```
<400> SEQUENCE: 90

000

<210> SEQ ID NO 91

<400> SEQUENCE: 91

000

<210> SEQ ID NO 92

<400> SEQUENCE: 92

000

<210> SEQ ID NO 93

<400> SEQUENCE: 93

000

<210> SEQ ID NO 94

<400> SEQUENCE: 94

000

<210> SEQ ID NO 95

<400> SEQUENCE: 95

000

<210> SEQ ID NO 96

<400> SEQUENCE: 96

000

<210> SEQ ID NO 97

<400> SEQUENCE: 97

000

<210> SEQ ID NO 98

<400> SEQUENCE: 98

000

<210> SEQ ID NO 99

<400> SEQUENCE: 99

000

<210> SEQ ID NO 100

<400> SEQUENCE: 100

000

<210> SEQ ID NO 101

<400> SEQUENCE: 101
```

000

<210> SEQ ID NO 102

<400> SEQUENCE: 102

000

<210> SEQ ID NO 103

<400> SEQUENCE: 103

000

<210> SEQ ID NO 104

<400> SEQUENCE: 104

000

<210> SEQ ID NO 105

<400> SEQUENCE: 105

000

<210> SEQ ID NO 106

<400> SEQUENCE: 106

000

<210> SEQ ID NO 107

<400> SEQUENCE: 107

000

<210> SEQ ID NO 108

<400> SEQUENCE: 108

000

<210> SEQ ID NO 109

<400> SEQUENCE: 109

000

<210> SEQ ID NO 110

<400> SEQUENCE: 110

000

<210> SEQ ID NO 111

<400> SEQUENCE: 111

000

<210> SEQ ID NO 112

<400> SEQUENCE: 112

000

<210> SEQ ID NO 113

<400> SEQUENCE: 113

000

<210> SEQ ID NO 114

<400> SEQUENCE: 114

000

<210> SEQ ID NO 115

<400> SEQUENCE: 115

000

<210> SEQ ID NO 116

<400> SEQUENCE: 116

000

<210> SEQ ID NO 117

<400> SEQUENCE: 117

000

<210> SEQ ID NO 118

<400> SEQUENCE: 118

000

<210> SEQ ID NO 119

<400> SEQUENCE: 119

000

<210> SEQ ID NO 120

<400> SEQUENCE: 120

000

<210> SEQ ID NO 121

<400> SEQUENCE: 121

000

<210> SEQ ID NO 122

<400> SEQUENCE: 122

000

<210> SEQ ID NO 123

<400> SEQUENCE: 123

000

```
<210> SEQ ID NO 124
<400> SEQUENCE: 124
000

<210> SEQ ID NO 125
<400> SEQUENCE: 125
000

<210> SEQ ID NO 126
<400> SEQUENCE: 126
000

<210> SEQ ID NO 127
<400> SEQUENCE: 127
000

<210> SEQ ID NO 128
<400> SEQUENCE: 128
000

<210> SEQ ID NO 129
<400> SEQUENCE: 129
000

<210> SEQ ID NO 130
<400> SEQUENCE: 130
000

<210> SEQ ID NO 131
<400> SEQUENCE: 131
000

<210> SEQ ID NO 132
<400> SEQUENCE: 132
000

<210> SEQ ID NO 133
<400> SEQUENCE: 133
000

<210> SEQ ID NO 134
<400> SEQUENCE: 134
000

<210> SEQ ID NO 135
```

```
<400> SEQUENCE: 135
000

<210> SEQ ID NO 136
<400> SEQUENCE: 136
000

<210> SEQ ID NO 137
<400> SEQUENCE: 137
000

<210> SEQ ID NO 138
<400> SEQUENCE: 138
000

<210> SEQ ID NO 139
<400> SEQUENCE: 139
000

<210> SEQ ID NO 140
<400> SEQUENCE: 140
000

<210> SEQ ID NO 141
<400> SEQUENCE: 141
000

<210> SEQ ID NO 142
<400> SEQUENCE: 142
000

<210> SEQ ID NO 143
<400> SEQUENCE: 143
000

<210> SEQ ID NO 144
<400> SEQUENCE: 144
000

<210> SEQ ID NO 145
<400> SEQUENCE: 145
000

<210> SEQ ID NO 146
<400> SEQUENCE: 146
```

000

<210> SEQ ID NO 147

<400> SEQUENCE: 147

000

<210> SEQ ID NO 148

<400> SEQUENCE: 148

000

<210> SEQ ID NO 149

<400> SEQUENCE: 149

000

<210> SEQ ID NO 150

<400> SEQUENCE: 150

000

<210> SEQ ID NO 151

<400> SEQUENCE: 151

000

<210> SEQ ID NO 152

<400> SEQUENCE: 152

000

<210> SEQ ID NO 153

<400> SEQUENCE: 153

000

<210> SEQ ID NO 154

<400> SEQUENCE: 154

000

<210> SEQ ID NO 155

<400> SEQUENCE: 155

000

<210> SEQ ID NO 156

<400> SEQUENCE: 156

000

<210> SEQ ID NO 157

<400> SEQUENCE: 157

000

```
<210> SEQ ID NO 158
<400> SEQUENCE: 158
000

<210> SEQ ID NO 159
<400> SEQUENCE: 159
000

<210> SEQ ID NO 160
<400> SEQUENCE: 160
000

<210> SEQ ID NO 161
<400> SEQUENCE: 161
000

<210> SEQ ID NO 162
<400> SEQUENCE: 162
000

<210> SEQ ID NO 163
<400> SEQUENCE: 163
000

<210> SEQ ID NO 164
<400> SEQUENCE: 164
000

<210> SEQ ID NO 165
<400> SEQUENCE: 165
000

<210> SEQ ID NO 166
<400> SEQUENCE: 166
000

<210> SEQ ID NO 167
<400> SEQUENCE: 167
000

<210> SEQ ID NO 168
<400> SEQUENCE: 168
000

<210> SEQ ID NO 169
```

<400> SEQUENCE: 169

000

<210> SEQ ID NO 170

<400> SEQUENCE: 170

000

<210> SEQ ID NO 171

<400> SEQUENCE: 171

000

<210> SEQ ID NO 172

<400> SEQUENCE: 172

000

<210> SEQ ID NO 173

<400> SEQUENCE: 173

000

<210> SEQ ID NO 174

<400> SEQUENCE: 174

000

<210> SEQ ID NO 175

<400> SEQUENCE: 175

000

<210> SEQ ID NO 176

<400> SEQUENCE: 176

000

<210> SEQ ID NO 177

<400> SEQUENCE: 177

000

<210> SEQ ID NO 178

<400> SEQUENCE: 178

000

<210> SEQ ID NO 179

<400> SEQUENCE: 179

000

<210> SEQ ID NO 180

<400> SEQUENCE: 180

000

<210> SEQ ID NO 181

<400> SEQUENCE: 181

000

<210> SEQ ID NO 182

<400> SEQUENCE: 182

000

<210> SEQ ID NO 183

<400> SEQUENCE: 183

000

<210> SEQ ID NO 184

<400> SEQUENCE: 184

000

<210> SEQ ID NO 185

<400> SEQUENCE: 185

000

<210> SEQ ID NO 186

<400> SEQUENCE: 186

000

<210> SEQ ID NO 187

<400> SEQUENCE: 187

000

<210> SEQ ID NO 188

<400> SEQUENCE: 188

000

<210> SEQ ID NO 189

<400> SEQUENCE: 189

000

<210> SEQ ID NO 190

<400> SEQUENCE: 190

000

<210> SEQ ID NO 191

<400> SEQUENCE: 191

000

<210> SEQ ID NO 192

<400> SEQUENCE: 192

000

<210> SEQ ID NO 193

<400> SEQUENCE: 193

000

<210> SEQ ID NO 194

<400> SEQUENCE: 194

000

<210> SEQ ID NO 195

<400> SEQUENCE: 195

000

<210> SEQ ID NO 196

<400> SEQUENCE: 196

000

<210> SEQ ID NO 197

<400> SEQUENCE: 197

000

<210> SEQ ID NO 198

<400> SEQUENCE: 198

000

<210> SEQ ID NO 199

<400> SEQUENCE: 199

000

<210> SEQ ID NO 200

<400> SEQUENCE: 200

000

<210> SEQ ID NO 201
<211> LENGTH: 173
<212> TYPE: PRT
<213> ORGANISM: Artificial Sequence
<220> FEATURE:
<223> OTHER INFORMATION: Synthetic: bfpFerritin-N19Q/C31S/S26C

<400> SEQUENCE: 201

Glu Ser Gln Val Arg Gln Gln Phe Ser Lys Asp Ile Glu Lys Leu Leu
1               5                   10                  15

Asn Glu Gln Val Asn Lys Glu Met Gln Ser Ser Asn Leu Tyr Met Cys
            20                  25                  30

Met Ser Ser Trp Ser Tyr Thr His Ser Leu Asp Gly Ala Gly Leu Phe
         35                  40                  45

Leu Phe Asp His Ala Ala Glu Glu Tyr Glu His Ala Lys Lys Leu Ile
 50                  55                  60

Ile Phe Leu Asn Glu Asn Asn Val Pro Val Gln Leu Thr Ser Ile Ser
 65                  70                  75                  80

Ala Pro Glu His Lys Phe Glu Gly Leu Thr Gln Ile Phe Gln Lys Ala
             85                  90                  95

Tyr Glu His Glu Gln His Ile Ser Glu Ser Ile Asn Asn Ile Val Asp
            100                 105                 110

His Ala Ile Lys Ser Lys Asp His Ala Thr Phe Asn Phe Leu Gln Trp
            115                 120                 125

Tyr Val Ala Glu Gln His Glu Glu Val Leu Phe Lys Asp Ile Leu
        130                 135                 140

Asp Lys Ile Glu Leu Ile Gly Asn Glu Asn His Gly Leu Tyr Leu Ala
145                 150                 155                 160

Asp Gln Tyr Val Lys Gly Ile Ala Lys Ser Arg Lys Ser
            165                 170

<210> SEQ ID NO 202
<211> LENGTH: 173
<212> TYPE: PRT
<213> ORGANISM: Artificial Sequence
<220> FEATURE:
<223> OTHER INFORMATION: Synthetic: bfpFerritin-N19Q/C31S/S72C

<400> SEQUENCE: 202

Glu Ser Gln Val Arg Gln Gln Phe Ser Lys Asp Ile Glu Lys Leu Leu
 1               5                  10                  15

Asn Glu Gln Val Asn Lys Glu Met Gln Ser Ser Asn Leu Tyr Met Ser
             20                  25                  30

Met Ser Ser Trp Ser Tyr Thr His Ser Leu Asp Gly Ala Gly Leu Phe
         35                  40                  45

Leu Phe Asp His Ala Ala Glu Glu Tyr Glu His Ala Lys Lys Leu Ile
 50                  55                  60

Ile Phe Leu Asn Glu Asn Asn Val Pro Val Gln Leu Thr Cys Ile Ser
 65                  70                  75                  80

Ala Pro Glu His Lys Phe Glu Gly Leu Thr Gln Ile Phe Gln Lys Ala
             85                  90                  95

Tyr Glu His Glu Gln His Ile Ser Glu Ser Ile Asn Asn Ile Val Asp
            100                 105                 110

His Ala Ile Lys Ser Lys Asp His Ala Thr Phe Asn Phe Leu Gln Trp
            115                 120                 125

Tyr Val Ala Glu Gln His Glu Glu Val Leu Phe Lys Asp Ile Leu
        130                 135                 140

Asp Lys Ile Glu Leu Ile Gly Asn Glu Asn His Gly Leu Tyr Leu Ala
145                 150                 155                 160

Asp Gln Tyr Val Lys Gly Ile Ala Lys Ser Arg Lys Ser
            165                 170

<210> SEQ ID NO 203
<211> LENGTH: 173
<212> TYPE: PRT
<213> ORGANISM: Artificial Sequence
<220> FEATURE:
<223> OTHER INFORMATION: Synthetic: bfpFerritin-N19Q/C31S/A75C

<400> SEQUENCE: 203

Glu Ser Gln Val Arg Gln Gln Phe Ser Lys Asp Ile Glu Lys Leu Leu
1               5                   10                  15

Asn Glu Gln Val Asn Lys Glu Met Gln Ser Ser Asn Leu Tyr Met Ser
            20                  25                  30

Met Ser Ser Trp Ser Tyr Thr His Ser Leu Asp Gly Ala Gly Leu Phe
        35                  40                  45

Leu Phe Asp His Ala Ala Glu Glu Tyr Glu His Ala Lys Lys Leu Ile
    50                  55                  60

Ile Phe Leu Asn Glu Asn Asn Val Pro Val Gln Leu Thr Ser Ile Ser
65                  70                  75                  80

Cys Pro Glu His Lys Phe Glu Gly Leu Thr Gln Ile Phe Gln Lys Ala
            85                  90                  95

Tyr Glu His Glu Gln His Ile Ser Glu Ser Ile Asn Asn Ile Val Asp
            100                 105                 110

His Ala Ile Lys Ser Lys Asp His Ala Thr Phe Asn Phe Leu Gln Trp
            115                 120                 125

Tyr Val Ala Glu Gln His Glu Glu Val Leu Phe Lys Asp Ile Leu
    130                 135                 140

Asp Lys Ile Glu Leu Ile Gly Asn Glu Asn His Gly Leu Tyr Leu Ala
145                 150                 155                 160

Asp Gln Tyr Val Lys Gly Ile Ala Lys Ser Arg Lys Ser
            165                 170

<210> SEQ ID NO 204
<211> LENGTH: 173
<212> TYPE: PRT
<213> ORGANISM: Artificial Sequence
<220> FEATURE:
<223> OTHER INFORMATION: Synthetic: bfpFerritin- N19Q/C31S/K79C

<400> SEQUENCE: 204

Glu Ser Gln Val Arg Gln Gln Phe Ser Lys Asp Ile Glu Lys Leu Leu
1               5                   10                  15

Asn Glu Gln Val Asn Lys Glu Met Gln Ser Ser Asn Leu Tyr Met Ser
            20                  25                  30

Met Ser Ser Trp Ser Tyr Thr His Ser Leu Asp Gly Ala Gly Leu Phe
        35                  40                  45

Leu Phe Asp His Ala Ala Glu Glu Tyr Glu His Ala Lys Lys Leu Ile
    50                  55                  60

Ile Phe Leu Asn Glu Asn Asn Val Pro Val Gln Leu Thr Ser Ile Ser
65                  70                  75                  80

Ala Pro Glu His Cys Phe Glu Gly Leu Thr Gln Ile Phe Gln Lys Ala
            85                  90                  95

Tyr Glu His Glu Gln His Ile Ser Glu Ser Ile Asn Asn Ile Val Asp
            100                 105                 110

His Ala Ile Lys Ser Lys Asp His Ala Thr Phe Asn Phe Leu Gln Trp
            115                 120                 125

Tyr Val Ala Glu Gln His Glu Glu Val Leu Phe Lys Asp Ile Leu
    130                 135                 140

Asp Lys Ile Glu Leu Ile Gly Asn Glu Asn His Gly Leu Tyr Leu Ala
145                 150                 155                 160

Asp Gln Tyr Val Lys Gly Ile Ala Lys Ser Arg Lys Ser
            165                 170

-continued

```
<210> SEQ ID NO 205
<211> LENGTH: 173
<212> TYPE: PRT
<213> ORGANISM: Artificial Sequence
<220> FEATURE:
<223> OTHER INFORMATION: Synthetic: bfpFerritin-N19Q/C31S/S100C

<400> SEQUENCE: 205
```

Glu Ser Gln Val Arg Gln Gln Phe Ser Lys Asp Ile Glu Lys Leu Leu
1               5                   10                  15

Asn Glu Gln Val Asn Lys Glu Met Gln Ser Ser Asn Leu Tyr Met Ser
            20                  25                  30

Met Ser Ser Trp Ser Tyr Thr His Ser Leu Asp Gly Ala Gly Leu Phe
        35                  40                  45

Leu Phe Asp His Ala Ala Glu Glu Tyr Glu His Ala Lys Lys Leu Ile
    50                  55                  60

Ile Phe Leu Asn Glu Asn Asn Val Pro Val Gln Leu Thr Ser Ile Ser
65                  70                  75                  80

Ala Pro Glu His Lys Phe Glu Gly Leu Thr Gln Ile Phe Gln Lys Ala
                85                  90                  95

Tyr Glu His Glu Gln His Ile Ser Glu Cys Ile Asn Asn Ile Val Asp
            100                 105                 110

His Ala Ile Lys Ser Lys Asp His Ala Thr Phe Asn Phe Leu Gln Trp
        115                 120                 125

Tyr Val Ala Glu Gln His Glu Glu Val Leu Phe Lys Asp Ile Leu
    130                 135                 140

Asp Lys Ile Glu Leu Ile Gly Asn Glu Asn His Gly Leu Tyr Leu Ala
145                 150                 155                 160

Asp Gln Tyr Val Lys Gly Ile Ala Lys Ser Arg Lys Ser
                165                 170

```
<210> SEQ ID NO 206
<211> LENGTH: 173
<212> TYPE: PRT
<213> ORGANISM: Artificial Sequence
<220> FEATURE:
<223> OTHER INFORMATION: Synthetic: bfpFerritin-N19Q/C31S/S111C

<400> SEQUENCE: 206
```

Glu Ser Gln Val Arg Gln Gln Phe Ser Lys Asp Ile Glu Lys Leu Leu
1               5                   10                  15

Asn Glu Gln Val Asn Lys Glu Met Gln Ser Ser Asn Leu Tyr Met Ser
            20                  25                  30

Met Ser Ser Trp Ser Tyr Thr His Ser Leu Asp Gly Ala Gly Leu Phe
        35                  40                  45

Leu Phe Asp His Ala Ala Glu Glu Tyr Glu His Ala Lys Lys Leu Ile
    50                  55                  60

Ile Phe Leu Asn Glu Asn Asn Val Pro Val Gln Leu Thr Ser Ile Ser
65                  70                  75                  80

Ala Pro Glu His Lys Phe Glu Gly Leu Thr Gln Ile Phe Gln Lys Ala
                85                  90                  95

Tyr Glu His Glu Gln His Ile Ser Glu Ser Ile Asn Asn Ile Val Asp
            100                 105                 110

His Ala Ile Lys Cys Lys Asp His Ala Thr Phe Asn Phe Leu Gln Trp
        115                 120                 125

Tyr Val Ala Glu Gln His Glu Glu Val Leu Phe Lys Asp Ile Leu
    130                 135                 140

```
Asp Lys Ile Glu Leu Ile Gly Asn Glu Asn His Gly Leu Tyr Leu Ala
145                 150                 155                 160

Asp Gln Tyr Val Lys Gly Ile Ala Lys Ser Arg Lys Ser
                165                 170
```

<210> SEQ ID NO 207
<211> LENGTH: 173
<212> TYPE: PRT
<213> ORGANISM: Artificial Sequence
<220> FEATURE:
<223> OTHER INFORMATION: Synthetic: bfpFerritin-N19Q/C31S/E12C

<400> SEQUENCE: 207

```
Glu Ser Gln Val Arg Gln Gln Phe Ser Lys Asp Ile Glu Lys Leu Leu
1               5                   10                  15

Asn Cys Gln Val Asn Lys Glu Met Gln Ser Ser Asn Leu Tyr Met Ser
                20                  25                  30

Met Ser Ser Trp Ser Tyr Thr His Ser Leu Asp Gly Ala Gly Leu Phe
            35                  40                  45

Leu Phe Asp His Ala Ala Glu Glu Tyr Glu His Ala Lys Lys Leu Ile
    50                  55                  60

Ile Phe Leu Asn Glu Asn Asn Val Pro Val Gln Leu Thr Ser Ile Ser
65                  70                  75                  80

Ala Pro Glu His Lys Phe Glu Gly Leu Thr Gln Ile Phe Gln Lys Ala
                85                  90                  95

Tyr Glu His Glu Gln His Ile Ser Glu Ser Ile Asn Asn Ile Val Asp
                100                 105                 110

His Ala Ile Lys Ser Lys Asp His Ala Thr Phe Asn Phe Leu Gln Trp
                115                 120                 125

Tyr Val Ala Glu Gln His Glu Glu Val Leu Phe Lys Asp Ile Leu
                130                 135                 140

Asp Lys Ile Glu Leu Ile Gly Asn Glu Asn His Gly Leu Tyr Leu Ala
145                 150                 155                 160

Asp Gln Tyr Val Lys Gly Ile Ala Lys Ser Arg Lys Ser
                165                 170
```

<210> SEQ ID NO 208
<211> LENGTH: 173
<212> TYPE: PRT
<213> ORGANISM: Helicobacter pylori J99
<220> FEATURE:
<221> NAME/KEY: misc_feature
<222> LOCATION: (1)..(173)
<223> OTHER INFORMATION: Exemplary H. pylori Ferritin with bullfrog
      linker

<400> SEQUENCE: 208

```
Glu Ser Gln Val Arg Gln Gln Phe Ser Lys Asp Ile Glu Lys Leu Leu
1               5                   10                  15

Asn Glu Gln Val Asn Lys Glu Met Asn Ser Ser Asn Leu Tyr Met Ser
                20                  25                  30

Met Ser Ser Trp Cys Tyr Thr His Ser Leu Asp Gly Ala Gly Leu Phe
            35                  40                  45

Leu Phe Asp His Ala Ala Glu Glu Tyr Glu His Ala Lys Lys Leu Ile
    50                  55                  60

Ile Phe Leu Asn Glu Asn Asn Val Pro Val Gln Leu Thr Ser Ile Ser
65                  70                  75                  80

Ala Pro Glu His Lys Phe Glu Gly Leu Thr Gln Ile Phe Gln Lys Ala
                85                  90                  95
```

Tyr Glu His Glu Gln His Ile Ser Glu Ser Ile Asn Asn Ile Val Asp
                100                 105                 110

His Ala Ile Lys Ser Lys Asp His Ala Thr Phe Asn Phe Leu Gln Trp
            115                 120                 125

Tyr Val Ala Glu Gln His Glu Glu Val Leu Phe Lys Asp Ile Leu
        130                 135                 140

Asp Lys Ile Glu Leu Ile Gly Asn Glu Asn His Gly Leu Tyr Leu Ala
145                 150                 155                 160

Asp Gln Tyr Val Lys Gly Ile Ala Lys Ser Arg Lys Ser
                165                 170

<210> SEQ ID NO 209
<211> LENGTH: 166
<212> TYPE: PRT
<213> ORGANISM: Helicobacter pylori J99
<220> FEATURE:
<221> NAME/KEY: misc_feature
<222> LOCATION: (1)..(166)
<223> OTHER INFORMATION: Exemplary wild-type H. pylori ferritin (without
      bullfrog linker or N-terminal Met)

<400> SEQUENCE: 209

Leu Ser Lys Asp Ile Ile Lys Leu Leu Asn Glu Gln Val Asn Lys Glu
1               5                   10                  15

Met Asn Ser Ser Asn Leu Tyr Met Ser Met Ser Ser Trp Cys Tyr Thr
            20                  25                  30

His Ser Leu Asp Gly Ala Gly Leu Phe Leu Phe Asp His Ala Ala Glu
        35                  40                  45

Glu Tyr Glu His Ala Lys Lys Leu Ile Ile Phe Leu Asn Glu Asn Asn
    50                  55                  60

Val Pro Val Gln Leu Thr Ser Ile Ser Ala Pro Glu His Lys Phe Glu
65                  70                  75                  80

Gly Leu Thr Gln Ile Phe Gln Lys Ala Tyr Glu His Glu Gln His Ile
                85                  90                  95

Ser Glu Ser Ile Asn Asn Ile Val Asp His Ala Ile Lys Ser Lys Asp
                100                 105                 110

His Ala Thr Phe Asn Phe Leu Gln Trp Tyr Val Ala Glu Gln His Glu
            115                 120                 125

Glu Val Leu Phe Lys Asp Ile Leu Asp Lys Ile Glu Leu Ile Gly
        130                 135                 140

Asn Glu Asn His Gly Leu Tyr Leu Ala Asp Gln Tyr Val Lys Gly Ile
145                 150                 155                 160

Ala Lys Ser Arg Lys Ser
                165

<210> SEQ ID NO 210
<211> LENGTH: 22
<212> TYPE: DNA
<213> ORGANISM: Artificial Sequence
<220> FEATURE:
<223> OTHER INFORMATION: Synthetic: CpG (ISS-1018)

<400> SEQUENCE: 210
tgactgtgaa cgttcgagat ga                                            22

<210> SEQ ID NO 211
<211> LENGTH: 191
<212> TYPE: PRT
<213> ORGANISM: Trichoplusia ni

```
<220> FEATURE:
<221> NAME/KEY: misc_feature
<222> LOCATION: (1)..(191)
<223> OTHER INFORMATION: Trichoplusia ni heavy chain ferritin

<400> SEQUENCE: 211
```

Thr Gln Cys Asn Val Asn Pro Val Gln Ile Pro Lys Asp Trp Ile Thr
1               5                   10                  15

Met His Arg Ser Cys Arg Asn Ser Met Arg Gln Gln Ile Gln Met Glu
            20                  25                  30

Val Gly Ala Ser Leu Gln Tyr Leu Ala Met Gly Ala His Phe Ser Lys
            35                  40                  45

Asp Val Val Asn Arg Pro Gly Phe Ala Gln Leu Phe Phe Asp Ala Ala
        50                  55                  60

Ser Glu Glu Arg Glu His Ala Met Lys Leu Ile Glu Tyr Leu Leu Met
65                  70                  75                  80

Arg Gly Glu Leu Thr Asn Asp Val Ser Ser Leu Leu Gln Val Arg Pro
                85                  90                  95

Pro Thr Arg Ser Ser Trp Lys Gly Gly Val Glu Ala Leu Glu His Ala
            100                 105                 110

Leu Ser Met Glu Ser Asp Val Thr Lys Ser Ile Arg Asn Val Ile Lys
            115                 120                 125

Ala Cys Glu Asp Asp Ser Glu Phe Asn Asp Tyr His Leu Val Asp Tyr
        130                 135                 140

Leu Thr Gly Asp Phe Leu Glu Glu Gln Tyr Lys Gly Gln Arg Asp Leu
145                 150                 155                 160

Ala Gly Lys Ala Ser Thr Leu Lys Lys Leu Met Asp Arg His Glu Ala
                165                 170                 175

Leu Gly Glu Phe Ile Phe Asp Lys Lys Leu Leu Gly Ile Asp Val
            180                 185                 190

```
<210> SEQ ID NO 212
<211> LENGTH: 212
<212> TYPE: PRT
<213> ORGANISM: Trichoplusia ni
<220> FEATURE:
<221> NAME/KEY: misc_feature
<222> LOCATION: (1)..(212)
<223> OTHER INFORMATION: Trichoplusia ni light chain ferritin

<400> SEQUENCE: 212
```

Ala Asp Thr Cys Tyr Asn Asp Val Ala Leu Asp Cys Gly Ile Thr Ser
1               5                   10                  15

Asn Ser Leu Ala Leu Pro Arg Cys Asn Ala Val Tyr Gly Glu Tyr Gly
            20                  25                  30

Ser His Gly Asn Val Ala Thr Glu Leu Gln Ala Tyr Ala Lys Leu His
            35                  40                  45

Leu Glu Arg Ser Tyr Asp Tyr Leu Leu Ser Ala Tyr Phe Asn Asn
        50                  55                  60

Tyr Gln Thr Asn Arg Ala Gly Phe Ser Lys Leu Phe Lys Lys Leu Ser
65                  70                  75                  80

Asp Glu Ala Trp Ser Lys Thr Ile Asp Ile Ile Lys His Val Thr Lys
                85                  90                  95

Arg Gly Asp Lys Met Asn Phe Asp Gln His Ser Thr Met Lys Thr Glu
            100                 105                 110

Arg Lys Asn Tyr Thr Ala Glu Asn His Glu Leu Glu Ala Leu Ala Lys
            115                 120                 125

```
Ala Leu Asp Thr Gln Lys Glu Leu Ala Glu Arg Ala Phe Tyr Ile His
    130                 135                 140

Arg Glu Ala Thr Arg Asn Ser Gln His Leu His Asp Pro Glu Ile Ala
145                 150                 155                 160

Gln Tyr Leu Glu Glu Glu Phe Ile Glu Asp His Ala Glu Lys Ile Arg
            165                 170                 175

Thr Leu Ala Gly His Thr Ser Asp Leu Lys Lys Phe Ile Thr Ala Asn
            180                 185                 190

Asn Gly His Asp Leu Ser Leu Ala Leu Tyr Val Phe Asp Glu Tyr Leu
        195                 200                 205

Gln Lys Thr Val
        210
```

<210> SEQ ID NO 213
<211> LENGTH: 174
<212> TYPE: PRT
<213> ORGANISM: Pyrococcus furiosus
<220> FEATURE:
<221> NAME/KEY: misc_feature
<222> LOCATION: (1)..(174)
<223> OTHER INFORMATION: Pyrococcus furiosus ferritin

<400> SEQUENCE: 213

```
Met Leu Ser Glu Arg Met Leu Lys Ala Leu Asn Asp Gln Leu Asn Arg
1               5                   10                  15

Glu Leu Tyr Ser Ala Tyr Leu Tyr Phe Ala Met Ala Ala Tyr Phe Glu
            20                  25                  30

Asp Leu Gly Leu Glu Gly Phe Ala Asn Trp Met Lys Ala Gln Ala Glu
        35                  40                  45

Glu Glu Ile Gly His Ala Leu Arg Phe Tyr Asn Tyr Ile Tyr Asp Arg
    50                  55                  60

Asn Gly Arg Val Glu Leu Asp Glu Ile Pro Lys Pro Pro Lys Glu Trp
65                  70                  75                  80

Glu Ser Pro Leu Lys Ala Phe Glu Ala Ala Tyr Glu His Glu Lys Phe
                85                  90                  95

Ile Ser Lys Ser Ile Tyr Glu Leu Ala Ala Leu Ala Glu Glu Glu Lys
            100                 105                 110

Asp Tyr Ser Thr Arg Ala Phe Leu Glu Trp Phe Ile Asn Glu Gln Val
        115                 120                 125

Glu Glu Glu Ala Ser Val Lys Lys Ile Leu Asp Lys Leu Lys Phe Ala
    130                 135                 140

Lys Asp Ser Pro Gln Ile Leu Phe Met Leu Asp Lys Glu Leu Ser Ala
145                 150                 155                 160

Arg Ala Pro Lys Leu Pro Gly Leu Leu Met Gln Gly Gly Glu
                165                 170
```

<210> SEQ ID NO 214
<211> LENGTH: 183
<212> TYPE: PRT
<213> ORGANISM: Homo sapiens
<220> FEATURE:
<221> NAME/KEY: misc_feature
<222> LOCATION: (1)..(183)
<223> OTHER INFORMATION: human heavy chain ferritin

<400> SEQUENCE: 214

```
Met Thr Thr Ala Ser Thr Ser Gln Val Arg Gln Asn Tyr His Gln Asp
1               5                   10                  15

Ser Glu Ala Ala Ile Asn Arg Gln Ile Asn Leu Glu Leu Tyr Ala Ser
```

```
                    20                  25                  30
Tyr Val Tyr Leu Ser Met Ser Tyr Phe Asp Arg Asp Asp Val Ala
                35                  40                  45
Leu Lys Asn Phe Ala Lys Tyr Phe Leu His Gln Ser His Glu Glu Arg
 50                  55                  60
Glu His Ala Glu Lys Leu Met Lys Leu Gln Asn Gln Arg Gly Gly Arg
 65                  70                  75                  80
Ile Phe Leu Gln Asp Ile Lys Lys Pro Asp Cys Asp Asp Trp Glu Ser
                85                  90                  95
Gly Leu Asn Ala Met Glu Cys Ala Leu His Leu Glu Lys Asn Val Gln
                100                 105                 110
Gln Ser Leu Leu Glu Leu His Lys Leu Ala Thr Asp Lys Asn Asp Pro
                115                 120                 125
His Leu Cys Asp Phe Ile Glu Thr His Tyr Leu Asn Glu Gln Val Lys
                130                 135                 140
Ala Ile Lys Glu Leu Gly Asp His Val Thr Asn Leu Arg Lys Met Gly
145                 150                 155                 160
Ala Pro Glu Ser Gly Leu Ala Glu Tyr Leu Phe Asp Lys His Thr Leu
                165                 170                 175
Gly Asp Ser Asp Gln Glu Ser
                180

<210> SEQ ID NO 215
<211> LENGTH: 204
<212> TYPE: PRT
<213> ORGANISM: Homo sapiens
<220> FEATURE:
<221> NAME/KEY: misc_feature
<222> LOCATION: (1)..(204)
<223> OTHER INFORMATION: human light chain ferritin

<400> SEQUENCE: 215

Met Asp Ser Lys Gly Ser Ser Gln Lys Gly Ser Arg Leu Leu Leu
 1                   5                  10                  15
Leu Val Val Ser Asn Leu Leu Leu Pro Gln Gly Val Leu Ala Ser Ser
                20                  25                  30
Gln Ile Arg Gln Asn Tyr Ser Thr Asp Val Glu Ala Ala Val Asn Ser
                35                  40                  45
Leu Val Asn Leu Tyr Leu Gln Ala Ser Tyr Thr Tyr Leu Ser Leu Gly
 50                  55                  60
Phe Tyr Phe Asp Arg Asp Asp Val Ala Leu Glu Gly Val Ser His Phe
 65                  70                  75                  80
Phe Arg Glu Leu Ala Glu Glu Lys Arg Glu Gly Tyr Glu Arg Leu Leu
                85                  90                  95
Lys Met Gln Asn Gln Arg Gly Gly Arg Ala Leu Phe Gln Asp Ile Lys
                100                 105                 110
Lys Pro Ala Glu Asp Glu Trp Gly Lys Thr Pro Asp Ala Met Lys Ala
                115                 120                 125
Ala Met Ala Leu Glu Lys Lys Leu Asn Gln Ala Leu Leu Asp Leu His
                130                 135                 140
Ala Leu Gly Ser Ala Arg Thr Asp Pro His Leu Cys Asp Phe Leu Glu
145                 150                 155                 160
Thr His Phe Leu Asp Glu Glu Val Lys Leu Ile Lys Lys Met Gly Asp
                165                 170                 175
His Leu Thr Asn Leu His Arg Leu Gly Gly Pro Glu Ala Gly Leu Gly
                180                 185                 190
```

Glu Tyr Leu Phe Glu Arg Leu Thr Leu Lys His Asp
         195                 200

<210> SEQ ID NO 216
<211> LENGTH: 154
<212> TYPE: PRT
<213> ORGANISM: Aquifex aeolicus
<220> FEATURE:
<221> NAME/KEY: misc_feature
<222> LOCATION: (1)..(154)
<223> OTHER INFORMATION: lumazine synthase from Aquifex aeolicus

<400> SEQUENCE: 216

Met Gln Ile Tyr Glu Gly Lys Leu Thr Ala Glu Gly Leu Arg Phe Gly
1               5                   10                  15

Ile Val Ala Ser Arg Phe Asn His Ala Leu Val Asp Arg Leu Val Glu
            20                  25                  30

Gly Ala Ile Asp Cys Ile Val Arg His Gly Gly Arg Glu Glu Asp Ile
        35                  40                  45

Thr Leu Val Arg Val Pro Gly Ser Trp Glu Ile Pro Val Ala Ala Gly
    50                  55                  60

Glu Leu Ala Arg Lys Glu Asp Ile Asp Ala Val Ile Ala Ile Gly Val
65                  70                  75                  80

Leu Ile Arg Gly Ala Thr Pro His Phe Asp Tyr Ile Ala Ser Glu Val
                85                  90                  95

Ser Lys Gly Leu Ala Asn Leu Ser Leu Glu Leu Arg Lys Pro Ile Thr
            100                 105                 110

Phe Gly Val Ile Thr Ala Asp Thr Leu Glu Gln Ala Ile Glu Arg Ala
        115                 120                 125

Gly Thr Lys His Gly Asn Lys Gly Trp Glu Ala Ala Leu Ser Ala Ile
    130                 135                 140

Glu Met Ala Asn Leu Phe Lys Ser Leu Arg
145                 150

<210> SEQ ID NO 217
<211> LENGTH: 8
<212> TYPE: PRT
<213> ORGANISM: Unknown
<220> FEATURE:
<223> OTHER INFORMATION: Bullfrog linker

<400> SEQUENCE: 217

Glu Ser Gln Val Arg Gln Gln Phe
1               5

<210> SEQ ID NO 218
<211> LENGTH: 15
<212> TYPE: PRT
<213> ORGANISM: Artificial Sequence
<220> FEATURE:
<223> OTHER INFORMATION: Synthetic: Cysteine-Thrombin-His Linker

<400> SEQUENCE: 218

Cys Leu Val Pro Arg Gly Ser Leu Glu His His His His His His
1               5                   10                  15

<210> SEQ ID NO 219
<211> LENGTH: 156
<212> TYPE: PRT
<213> ORGANISM: Artificial Sequence
<220> FEATURE:
<223> OTHER INFORMATION: Synthetic: E. coli 6,7-dimethyl-8- ribityllumazine synthase

<400> SEQUENCE: 219

Met Asn Ile Ile Glu Ala Asn Val Ala Thr Pro Asp Ala Arg Val Ala
1               5                   10                  15

Ile Thr Ile Ala Arg Phe Asn Asn Phe Ile Asn Asp Ser Leu Leu Glu
            20                  25                  30

Gly Ala Ile Asp Ala Leu Lys Arg Ile Gly Gln Val Lys Asp Glu Asn
        35                  40                  45

Ile Thr Val Val Trp Val Pro Gly Ala Tyr Glu Leu Pro Leu Ala Ala
    50                  55                  60

Gly Ala Leu Ala Lys Thr Gly Lys Tyr Asp Ala Val Ile Ala Leu Gly
65                  70                  75                  80

Thr Val Ile Arg Gly Gly Thr Ala His Phe Glu Tyr Val Ala Gly Gly
                85                  90                  95

Ala Ser Asn Gly Leu Ala His Val Ala Gln Asp Ser Glu Ile Pro Val
            100                 105                 110

Ala Phe Gly Val Leu Thr Thr Glu Ser Ile Glu Gln Ala Ile Glu Arg
        115                 120                 125

Ala Gly Thr Lys Ala Gly Asn Lys Gly Ala Glu Ala Leu Thr Ala
    130                 135                 140

Leu Glu Met Ile Asn Val Leu Lys Ala Ile Lys Ala
145                 150                 155

<210> SEQ ID NO 220
<211> LENGTH: 16
<212> TYPE: PRT
<213> ORGANISM: Artificial Sequence
<220> FEATURE:
<223> OTHER INFORMATION: Synthetic: 16 amino acid linker

<400> SEQUENCE: 220

Gly Gly Gly Gly Ser Gly Gly Gly Ser Gly Gly Gly Gly Ser
1               5                   10                  15

<210> SEQ ID NO 221
<211> LENGTH: 28
<212> TYPE: PRT
<213> ORGANISM: Artificial Sequence
<220> FEATURE:
<223> OTHER INFORMATION: Synthetic: 28 amino acid linker

<400> SEQUENCE: 221

Gly Gly Ser Gly Ser Gly Ser Asn Ser Ser Ala Ser Ser Gly Ala Ser
1               5                   10                  15

Ser Gly Gly Ala Ser Gly Gly Ser Gly Gly Ser Gly
            20                  25

<210> SEQ ID NO 222
<211> LENGTH: 46
<212> TYPE: PRT
<213> ORGANISM: Artificial Sequence
<220> FEATURE:
<223> OTHER INFORMATION: Synthetic: 46 amino acid linker

<400> SEQUENCE: 222

Gly Gly Ser Gly Ser Ala Ser Ser Gly Ala Ser Ala Ser Gly Ser Ser
1               5                   10                  15

Asn Gly Ser Gly Ser Gly Ser Gly Ser Asn Ser Ser Ala Ser Ser Gly
            20                  25                  30

Ala Ser Gly Gly Ala Ser Gly Gly Ser Gly Gly Ser Gly
         35                  40                  45

<210> SEQ ID NO 223
<211> LENGTH: 26
<212> TYPE: PRT
<213> ORGANISM: Artificial Sequence
<220> FEATURE:
<223> OTHER INFORMATION: Synthetic: FR1

<400> SEQUENCE: 223

Gly Gly Ser Gly Ser Ala Ser Ala Glu Ala Ala Lys Glu Ala Ala
1               5                   10                  15

Ala Lys Ala Gly Gly Ser Gly Gly Ser Gly
            20                  25

<210> SEQ ID NO 224
<211> LENGTH: 32
<212> TYPE: PRT
<213> ORGANISM: Artificial Sequence
<220> FEATURE:
<223> OTHER INFORMATION: Synthetic: FR2

<400> SEQUENCE: 224

Gly Gly Ser Gly Ser Ala Ser Ala Glu Ala Ala Lys Glu Ala Ala
1               5                   10                  15

Ala Lys Glu Ala Ala Lys Ala Ser Gly Gly Ser Gly Gly Ser Gly
            20                  25                  30

<210> SEQ ID NO 225

<400> SEQUENCE: 225

000

<210> SEQ ID NO 226
<211> LENGTH: 299
<212> TYPE: PRT
<213> ORGANISM: Human respiratory syncytial virus B
<220> FEATURE:
<221> NAME/KEY: misc_feature
<222> LOCATION: (1)..(299)
<223> OTHER INFORMATION: RSV G B strain Native

<400> SEQUENCE: 226

Met Ser Lys His Lys Asn Gln Arg Thr Ala Arg Thr Leu Glu Lys Thr
1               5                   10                  15

Trp Asp Thr Leu Asn His Leu Ile Val Ile Ser Ser Cys Leu Tyr Arg
            20                  25                  30

Leu Asn Leu Lys Ser Ile Ala Gln Ile Ala Leu Ser Val Leu Ala Met
        35                  40                  45

Ile Ile Ser Thr Ser Leu Ile Ile Ala Ala Ile Ile Phe Ile Ile Ser
    50                  55                  60

Ala Asn His Lys Val Thr Leu Thr Thr Val Thr Val Gln Thr Ile Lys
65                  70                  75                  80

Asn His Thr Glu Lys Asn Ile Thr Thr Tyr Leu Thr Gln Val Pro Pro
                85                  90                  95

Glu Arg Val Ser Ser Ser Lys Gln Pro Thr Thr Thr Ser Pro Ile His
                100                 105                 110

Thr Asn Ser Ala Thr Thr Ser Pro Asn Thr Lys Ser Glu Thr His His
            115                 120                 125

Thr Thr Ala Gln Thr Lys Gly Arg Thr Thr Thr Ser Thr Gln Thr Asn

```
            130             135             140
Lys Pro Ser Thr Lys Pro Arg Leu Lys Asn Pro Pro Lys Lys Pro Lys
145             150             155             160

Asp Asp Tyr His Phe Glu Val Phe Asn Phe Val Pro Cys Ser Ile Cys
                165             170             175

Gly Asn Asn Gln Leu Cys Lys Ser Ile Cys Lys Thr Ile Pro Ser Asn
            180             185             190

Lys Pro Lys Lys Pro Thr Ile Lys Pro Thr Asn Lys Pro Thr Thr
        195             200             205

Lys Thr Thr Asn Lys Arg Asp Pro Lys Thr Pro Ala Lys Thr Thr Lys
    210             215             220

Lys Glu Thr Thr Thr Asn Pro Thr Lys Lys Pro Thr Leu Thr Thr Thr
225             230             235             240

Glu Arg Asp Thr Ser Thr Ser Gln Ser Thr Val Leu Asp Thr Thr Thr
                245             250             255

Leu Glu His Thr Ile Gln Gln Gln Ser Leu His Ser Thr Thr Pro Glu
                260             265             270

Asn Thr Pro Asn Ser Thr Gln Thr Pro Thr Ala Ser Glu Pro Ser Thr
        275             280             285

Ser Asn Ser Thr Gln Asn Thr Gln Ser His Ala
290             295
```

ANTIGENIC MULTIMERIC RESPIRATORY SYNCYTIAL VIRUS POLYPEPTIDES

This application is a Continuation of International Application No. PCT/US2020/026198, filed on Apr. 1, 2020, which claims the benefit of priority to U.S. Provisional Application No. 62/828,302, filed on Apr. 2, 2019, both of which are incorporated by reference in their entirety.

The instant application contains a Sequence Listing which has been submitted electronically in ASCII format and is hereby incorporated by reference in its entirety. Said ASCII copy, created on Sep. 28, 2021, is named 2021-09-29_01121-0042-00US_ST25.txt and is 55.9 KB in size.

Even with many successes in the field of vaccinology, new breakthroughs are needed to protect humans against many life-threatening infectious diseases. Many currently licensed vaccines rely on decade-old technologies to produce live-attenuated or inactivated killed pathogens, which carry inherent safety concerns and in many cases, stimulate only short-lived, weak immune responses that require the administration of multiple doses. While advances in genetic and biochemical engineering have made it possible to develop therapeutic agents to challenging disease targets, these applications to the field of vaccinology have not been fully realized. Recombinant polypeptide technologies now allow the design of optimal antigens. Additionally, nanoparticles have increasingly demonstrated the potential for optimal antigen presentation and targeted drug delivery. Nanoparticles with multiple attached antigens have been shown to have increased binding avidity afforded by the multivalent display of their molecular cargos, and an ability to cross biological barriers more efficiently due to their nanoscopic size. *Helicobacter pylori* (*H. pylori*) ferritin nanoparticles fused to influenza virus haemagglutinin (HA) polypeptide has allowed improved antigen stability and increased immunogenicity in mouse influenza models (see Kanekiyo et al., Nature 499:102-106 (2013)). This fusion polypeptide self-assembled into an octahedrally-symmetric nanoparticle and presented 8 trimeric HA spikes to give a robust immune response in various pre-clinical models when used with an adjuvant.

Respiratory syncytial virus (RSV) is a leading cause of severe respiratory disease in infants and a major cause of respiratory illness in the elderly. It remains an unmet vaccine need despite decades of research. While the need for a vaccine is clear, development of an RSV vaccine was stymied in the 1960's when a clinical trial using a formalin inactivated RSV virus made disease, following RSV infection, more severe in infants. See, Hurwitz (2011) Expert Rev Vaccines 10(10): 1415-1433. More recently, clinical programs using an RSV F antigen in its post-fusion conformation failed to elicit sufficient efficacy in adults. See, Faloon et al. (2017) JID 216:1362-1370.

RSV G is a largely unstructured polypeptide with the first and last third of the molecule comprising several O-glycosylation sites. The ectodomain of RSV G, when expressed in mammalian cells, is by mass more glycan than amino acid. These flanking regions are also poorly conserved, giving rise to the name the G hypervariable regions. In contrast, the central region of G is fairly well conserved between the two major strains of RSV, the A and the B strain. Thus, this domain is referred to as the RSV G central conserved region (Gcc).

The Gcc region is further subdivided into the proximal region, a structured loop stabilized by hydrophobic and proline-rich sequences, and the distal region, consisting of two helices held together by two disulfide bonds forming the so-called "cystine noose." The distal cysteine noose contains the CX3C motif demonstrated to be the binding motif of the virus for the CX3C receptor on the HAE cells. The proximal region harbors the only well-characterized neutralizing epitope for RSV G, the 131-2G epitope. While no structure exists for the complete RSV Gcc, data suggests the two structured regions form a higher tertiary structure which places the proximal region in close proximity to the distal region, thus explaining why the NAb 131-2G can sterically block the CX3C site and thus inhibit binding of the virus to the CX3CR receptor.

The Gcc alone is a poor immunogen, given the small size of the approximately 30 amino acid domain. We previously demonstrated that this domain can be synthesized as a peptide and chemically conjugated to the ferritin nanoparticle forming the bio-conjugate Gcc-NP. This lead antigen elicits a potent neutralizing response as observed in the HAE neutralizing assay. Furthermore, the antigen lacks the potentially immune distracting hypervariable regions which would make the G ectomain a poor vaccine candidate.

Here, a set of new polypeptides, nanoparticles, compositions, methods, and uses involving RSV G polypeptides is presented. Novel RSV G polypeptides were generated, including polypeptides in which the Gcc peptide is presented as a multimeric antigen. Gcc polypeptides from both an RSV A strain (the laboratory A2 strain) and an RSV B strain (the laboratory B1 strain) were utilized to provide broader scope of protection.

SUMMARY

It is an object of this disclosure to provide compositions, kits, methods, and uses that can provide one or more of the advantages discussed above, or at least provide the public with a useful choice.

In some embodiments, an antigenic RSV G polypeptide is provided comprising more than two RSV Gcc monomers, wherein the polypeptide does not comprise ferritin. In some embodiments, the antigenic RSV G polypeptide is a single chain.

In some embodiments, antigenic RSV G polypeptides are provided, wherein the G polypeptide is a Gcc polypeptide displayed as a particle (e.g., multimer). In some embodiments, a dimer comprising one Gcc A strain and on Gcc B strain are fused together genetically with an N- or C-terminal foldon tag. Upon refolding from the cell in which is it expressed, e.g., *E. coli*, the foldon tag trimerizes, and the resulting particle presents six copies of the Gcc polypeptide (3 of A and 3 of B strain), which is sometimes referred to herein as "Gcc B1-A2-foldon" or "Gcc hexamer." In some embodiments, four Gcc peptides (in any order, including from N- to C-terminus B1, A2, B1 and A2) are genetically fused together with glutamate rich linkers to produce a soluble tetramer of Gcc peptides (sometimes herein referred to herein as "Gcc Tetramer"). The Gcc tetramer lacks a multimerization domain and therefore does not form a particle.

Further embodiments are disclosed herein as follows:

| | |
|---|---|
| Embodiment 01. | An antigenic RSV G polypeptide comprising more than two RSV Gcc monomers, wherein the polypeptide does not comprise ferritin. |
| Embodiment 02. | The antigenic RSV G polypeptide of embodiment 1, wherein the polypeptide is a single chain. |
| Embodiment 03. | An antigenic RSV G single chain polypeptide comprising more than two RSV Gcc monomers. |
| Embodiment 04. | The antigenic RSV G polypeptide of any one of the preceding embodiments, comprising 3, 4, 5, 6, 7, 8, 9, or 10 Gcc monomers. |
| Embodiment 05. | The antigenic RSV G polypeptide of any one of the preceding embodiments, comprising a) Gcc monomers of strain A only; b) Gcc monomers of strain B only; or c) Gcc monomers of strain A and strain B. |
| Embodiment 06. | The antigenic RSV G polypeptide of any one of the preceding embodiments, comprising more than two Gcc monomers of strain A. |
| Embodiment 07. | The antigenic RSV G polypeptide of any one of the preceding embodiments, comprising more than two Gcc monomers of strain B. |
| Embodiment 08. | The antigenic RSV G polypeptide of any one of the preceding embodiments, comprising at least one Gcc monomer of strain A and at least one Gcc monomer of strain B. |
| Embodiment 09. | The antigenic RSV G polypeptide of any one of the preceding embodiments, wherein the polypeptide is a trimer, tetramer, or hexamer. |
| Embodiment 10. | The antigenic RSV G polypeptide of any one of the preceding embodiments, comprising three Gcc monomers of strain A. |
| Embodiment 11. | The antigenic RSV G polypeptide of any one of the preceding embodiments, comprising three Gcc monomers of strain B. |
| Embodiment 12. | The antigenic RSV G polypeptide of any one of the preceding embodiments, comprising three Gcc monomers of strain A and three Gcc monomers of strain B. |
| Embodiment 13. | The antigenic RSV G polypeptide of any one of the preceding embodiments, comprising a multimerization domain. |
| Embodiment 14. | The antigenic RSV G polypeptide of any one of the preceding embodiments, comprising 1, 2, 3, 4, 5, 6, 7, 8, 9, or 10 multimerization domains. |
| Embodiment 15. | The antigenic RSV G polypeptide of embodiment 13 or 14, wherein the multimerization domain is a foldon. |
| Embodiment 16. | The antigenic RSV G polypeptide of embodiment 13 or 14, wherein the multimerization domain comprises SEQ ID NO: 9. |
| Embodiment 16.1. | The antigenic RSV G polypeptide of embodiment 13 or 14, wherein the multimerization domain comprises SEQ ID NO: 13. |
| Embodiment 17. | The antigenic RSV G polypeptide of any one of the preceding embodiments, comprising two Gcc monomers of strain A and two Gcc monomer of strain B. |
| Embodiment 18. | The antigenic RSV G polypeptide of embodiment 17, wherein the monomers of strain A and B alternate in order in a single chain. |
| Embodiment 19. | The antigenic RSV G polypeptide of any one of the preceding embodiments, comprising an amino acid sequence with 80%, 85%, 90%, 95%, 98%, 99%, or 100% identity to any one of SEQ ID NOs: 4-8. |
| Embodiment 20. | The antigenic RSV G polypeptide of any one of the preceding embodiments, wherein the antigenic RSV G polypeptide is encoded by a polynucleotide encoding at least two RSV Gcc monomers and at least one multimerization domain; or at least three RSV Gcc monomers. |
| Embodiment 21. | The antigenic RSV G polypeptide of embodiment 20, wherein the antigenic RSV G polypeptide is encoded by a polynucleotide encoding at least two RSV Gcc monomers and at least one multimerization domain. |
| Embodiment 22. | The antigenic RSV G polypeptide of embodiment 21, wherein at least one Gcc monomer is from strain A and at least one Gcc monomer is from strain B. |
| Embodiment 23. | The antigenic RSV G polypeptide of any one of embodiments 20-22, wherein the polynucleotide encoding the RSV Gcc from strain A encodes:<br>a. the same sequence of amino acids as SEQ ID NO: 3; or<br>b. the same sequence of amino acids as SEQ ID NO: 3 without the C-terminal K; or<br>c. the same sequence of amino acids as amino acids 2-42 of SEQ ID NO: 4. |
| Embodiment 24. | The antigenic RSV G polypeptide of any one of embodiments 20-22, wherein the polynucleotide encoding the RSV Gcc from strain B encodes:<br>a. the same sequence of amino acids as SEQ ID NO: 10; or<br>b. the same sequence of amino acids as amino acids 10-51 of SEQ ID NO: 8. |
| Embodiment 25. | The antigenic RSV G polypeptide of any one of embodiments 20-24, wherein the polynucleotide encoding the multimerization domain encodes the same sequence of amino acids as:<br>a. SEQ ID NO: 11; or<br>b. amino acids 132-175 of SEQ ID NO: 7. |

| | |
|---|---|
| Embodiment 25.1. | The antigenic RSV G polypeptide of any one of embodiments 13, 15, 16.1, 19, or 22, comprising an amino acid sequence with 80%, 85%, 90%, 95%, 98%, 99%, or 100% identity to SEQ ID NO: 14. |
| Embodiment 26. | The antigenic RSV G polypeptide of any one of embodiments 20-25.1, capable of forming a Gcc particle upon expression of the polynucleotide in a host cell. |
| Embodiment 27. | The antigenic RSV G polypeptide of embodiment 26, wherein the polypeptide is a particle and the particle is a hexamer. |
| Embodiment 28. | The antigenic RSV G polypeptide of embodiment 26, wherein the hexamer comprises three RSV Gcc strain A monomers and three RSV Gcc strain B monomers. |
| Embodiment 29. | The antigenic RSV G polypeptide of embodiment 20, wherein the antigenic RSV G polypeptide is encoded by a polynucleotide encoding at least three RSV Gcc monomers. |
| Embodiment 30. | The antigenic RSV G polypeptide of embodiment 29, wherein the polynucleotide encodes four RSV Gcc monomers. |
| Embodiment 31. | The antigenic RSV G polypeptide of embodiment 30, wherein the polynucleotide encodes two Gcc monomers are of strain A and two Gcc monomers are of strain B. |
| Embodiment 32. | The antigenic RSV G polypeptide of embodiment 31, wherein the polynucleotide encodes the two Gcc monomers of strain A and the two Gcc monomers of strain B in alternating order. |
| Embodiment 33. | The antigenic RSV G polypeptide of any one of the preceding embodiments, wherein the antigenic RSV G polypeptide is capable of eliciting an immune response to RSV and/or protecting a subject against RSV infection. |
| Embodiment 34. | A composition comprising the antigenic RSV G polypeptide of any one of embodiments 1-33, further comprising a pharmaceutically acceptable carrier. |
| Embodiment 35. | The antigenic RSV G polypeptide or composition of any one of embodiments 1-34 for use in a method of eliciting an immune response to RSV or in protecting a subject against RSV infection. |
| Embodiment 36. | A method of eliciting an immune response to RSV or protecting a subject against RSV infection comprising administering the antigenic RSV G polypeptide or composition of any one of embodiments 1-34 to a subject. |
| Embodiment 37. | The antigenic RSV G polypeptide or composition of embodiment 34, or the method of embodiment 36, wherein the subject is human. |
| Embodiment 38. | A nucleic acid encoding the antigenic RSV polypeptide of any one of embodiments 1-33, optionally wherein the nucleic acid is an mRNA. |

Additional objects and advantages will be set forth in part in the description which follows, and in part will be obvious from the description, or may be learned by practice. The objects and advantages will be realized and attained by means of the elements and combinations particularly pointed out in the appended claims.

It is to be understood that both the foregoing general description and the following detailed description are exemplary and explanatory only and are not restrictive of the claims.

The accompanying drawings, which are incorporated in and constitute a part of this specification, illustrate several embodiments and together with the description, serve to explain the principles described herein.

BRIEF DESCRIPTION OF THE DRAWINGS

Figures 1A, 1B:
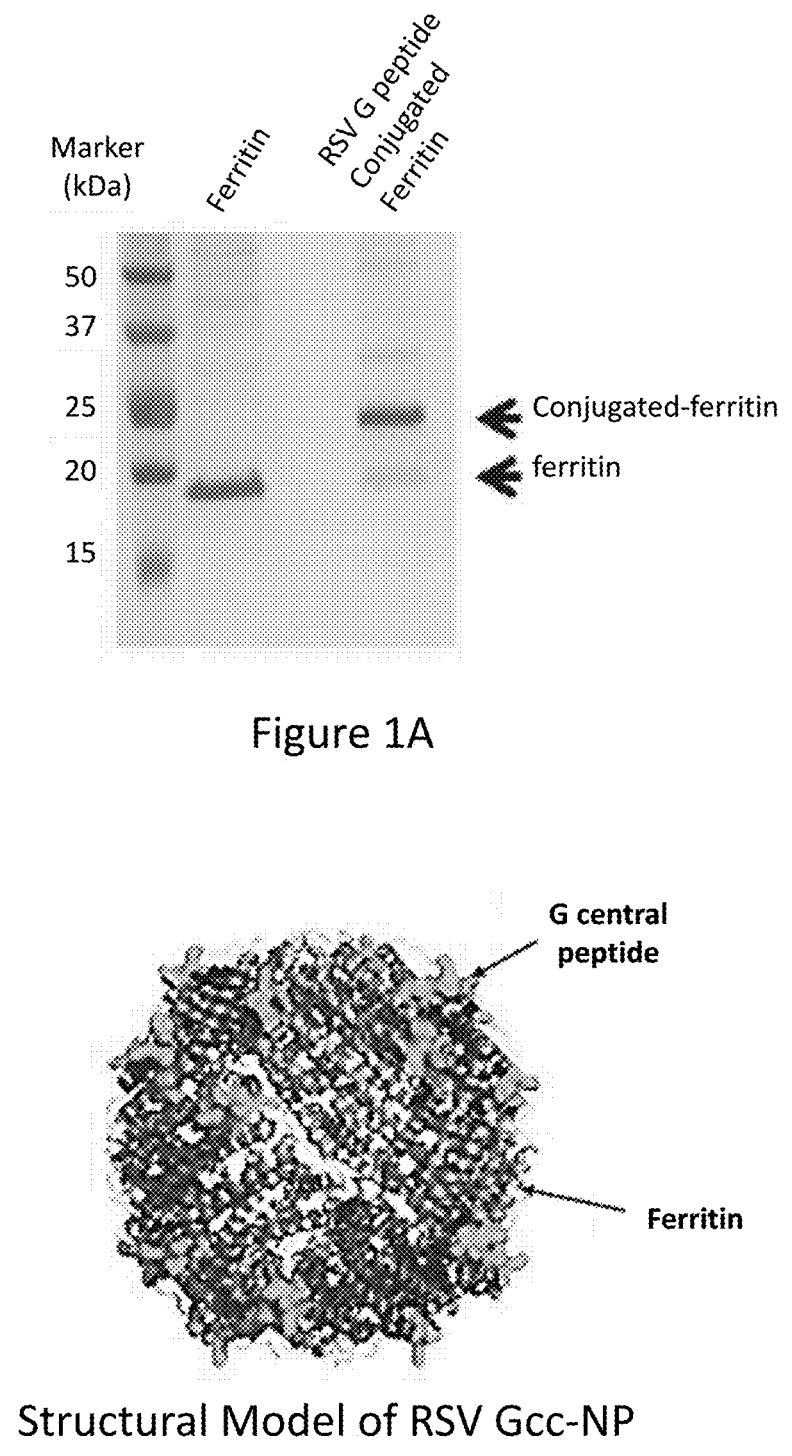

FIGS. 1A-B. Characterization of RSV G central domain peptide (Gcc) conjugated to ferritin nanoparticle. (FIG. 1A) Coomassie-stained SDS-PAGE gel showing the click-conjugation of RSV G central domain (SEQ ID NO. 12) to ferritin nanoparticle, forming the Gcc-NP antigen. (FIG. 1B) Structural model of Gcc-NP.

FIGS. 2A-C. Exemplary RSV chimeric antigens. (FIG. 2A) One B1 strain Gcc peptide sequence is fused to an A2 strain Gcc peptide sequence followed by a foldon trimerization tag. A modeled structure of the hypothetical folded construct is displayed where the tandem Gcc peptides trimerize by virtue of the foldon tag and thus display 6 copies of the Gcc peptide. Sometimes referred to as "B1-A2-foldon." (FIG. 2B) Two copies each of Gcc peptide sequence from A and B strain are fused in the (optionally in the order A2-B1-A2-B1) forming a tetramer chimera polypeptide. Unlike B1-A2-foldon, this construct does not require folding into a higher tertiary structure. (FIG. 2C) One copy of the A2 strain Gcc peptide is fused to an aparticle protomer at its N-terminus while one copy of the B1 strain Gcc peptide is fused to the C-terminus. A modeled structure of the hypothetical folded construct is shown where the α protomers form a particle core with numerous copies of the Gcc peptides displayed on the surface.

(FIG. 3A) RSV A strain HAE neutralizing titer elicited from immunization with G antigens formulated with AF03 from sera taken two weeks post the second immunization (2wp2). Neutralizing responses from naïve sera and a hyperimmune sera are shown as negative and positive controls, respectively. In each graph, immunogen used in the immunization is indicated below the x-axis. (FIG. 3B) RSV A strain HAE neutralizing titer elicited from immunization with G antigen formulated with AF03 from sera taken two weeks post the third immunization. Control sera and immunogens are labeled. (FIG. 3C) RSV B strain HAE neutralizing titer elicited from immunization with G antigen formulated with AF03 from sera taken two weeks post the third immunization. Control sera and immunogens are labeled.

(FIG. 4A) Gcc-binding antibody responses elicited to the Gcc A2 strain measured at two weeks post the second injection (light grey boxes) and two weeks post the third injection (dark grey boxes) elicited by a high dose (5 µg) of RSV G chimeric antigens. Naïve mouse sera response is shown as a negative control. Immunogens are labeled below the x-axis. (FIG. 4B) Gcc-binding antibody responses elicited to the Gcc A2 strain measured at two weeks post the second injection (light grey boxes) and two weeks post the third injection (dark grey boxes) elicited by the low dose (0.5 µg) of RSV G chimeric antigens. Naïve mouse sera and immunogens are labeled as above.

(FIG. 5A) Gcc-binding antibody responses elicited to the Gcc B1 strain measured at two weeks post the second injection (light grey boxes) and two weeks post the third injection (dark grey boxes) elicited by a high dose (5 µg) of RSV G chimeric antigens. Naïve mouse sera response is shown as a negative control. Immunogens are labeled below the x-axis. (FIG. 5B) Gcc-binding antibody responses elicited to the Gcc B1 strain measured at two weeks post the second injection (light grey boxes) and two weeks post the third injection (dark grey boxes) elicited by a low dose (0.5 µg) of RSV G chimeric antigens. Naïve mouse sera and immunogens are labeled as above.

DETAILED DESCRIPTION

Figure 3A:
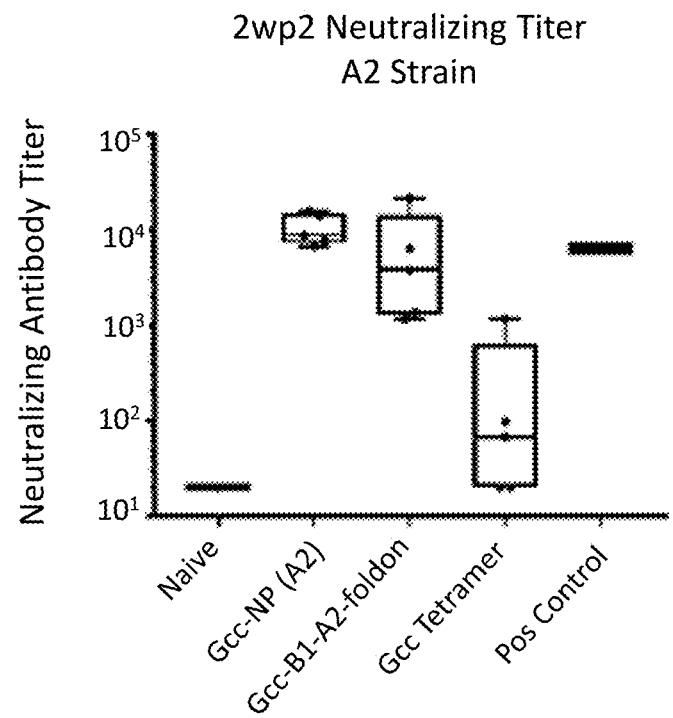
FIGS. 3A-C. Neutralizing antibody titers elicited by a low dose (0.5 µg) of RSV G antigens.
Figure 3B:
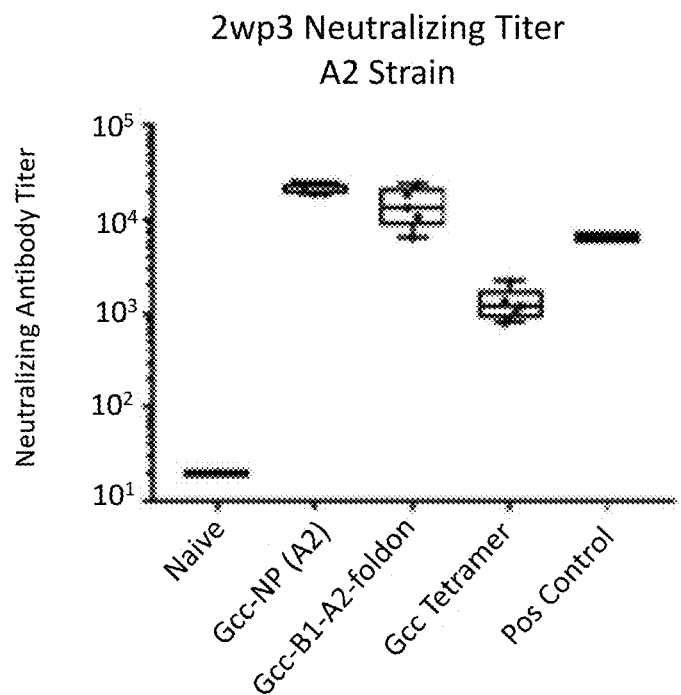
Figure 3C:
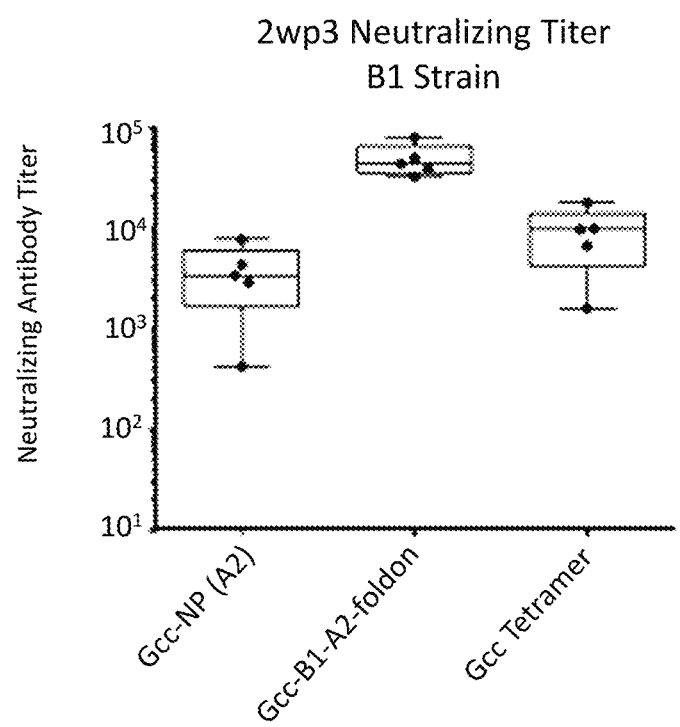

Antigenic RSV G polypeptides are provided that are antigenic when administered alone, or with adjuvant as a separate molecule. In some embodiments, the antigenic RSV G polypeptides comprise more than two RSV Gcc monomers. In some embodiments, the RSV G polypeptides do not comprise ferritin. In some embodiments, the RSV G polypeptides are single chain. In some embodiments, the RSV G polypeptides comprise a multimerization domain. In some embodiments, the RSV G polypeptides are particles/multimers, e.g., timers, tetramers, or hexamers.

A. Definitions

"F polypeptide," or "RSV F polypeptide" refers to the polypeptide of RSV responsible for driving fusion of the viral envelope with host cell membrane during viral entry.

"G polypeptide" or "RSV G polypeptide" as used herein, refers to the attachment polypeptide responsible for associating RSV with human airway epithelial cells. An exemplary wild-type RSV G amino acid sequence is provided as SEQ ID NO: 1. RSV G polypeptide comprises an ectodomain (approximately amino acids 66-297 of RSV G (SEQ ID NO: 2)) that resides extracellularly. Within the ectodomain of RSV G is a central conserved region (Gcc or CCR, approximately amino acids 151-193 of SEQ ID NO: 1). The CCR of RSV G comprises a CX3C motif. The CX3C motif mediates binding of G polypeptide to the CX3CR1 receptor.

"Protomer," as used herein, refers to a structural unit of an oligomeric polypeptide.

"Ferritin" or "ferritin polypeptide," as used herein, refers to a polypeptide with detectable sequence identity to *H. pylori* ferritin (SEQ ID NO: 208 or 209) or another ferritin, such as *P. furiosus* ferritin, *Trichoplusia ni* ferritin, or human ferritin, that serves to store iron, e.g., intracellularly or in tissues or to carry iron in the bloodstream. Such exemplary ferritins, include those that occur as two polypeptide chains, known as the heavy and light chains (e.g., *T. ni* and human ferritin). A ferritin may be a fragment of a full-length naturally-occurring sequence.

As used herein, a "monomer" refers to a single molecule that has not assembled with other molecules.

As used herein, "particle," or "multimer" refers to a self-assembled globular form. Exemplary "particles" include constructs comprising a multimerization domain (e.g., foldon). A multimerization domain may function to brings multiple copies of a molecule together. "Particle" and "multimer" are used interchangeably herein except where differentiated. An exemplary particle is the "Gcc B1-A2-foldon," which forms a hexamer (three copies of the Gcc B1 and three copies of the Gcc A2). The "Gcc tetramer" described herein is not a "particle/multimer" as it is not a self-assembled globular form.

An "RSV Gcc polypeptide" includes monomeric and particle/multimer forms of RSV Gcc.

"Immune response," as used herein, refers to a response of a cell of the immune system, such as a B cell, T cell, dendritic cell, macrophage or polymorphonucleocyte, to a stimulus such as an antigen or vaccine. An immune response can include any cell of the body involved in a host defense response, including for example, an epithelial cell that secretes an interferon or a cytokine. An immune response includes, but is not limited to, an innate and/or adaptive immune response. As used herein, a "protective immune response" refers to an immune response that protects a subject from infection (e.g., prevents infection or prevents the development of disease associated with infection). Methods of measuring immune responses are well known in the art and include, for example, by measuring proliferation and/or activity of lymphocytes (such as B or T cells), secretion of cytokines or chemokines, inflammation, antibody production and the like. An "antibody response" is an immune response in which antibodies are produced.

As used herein, an "antigen" refers to an agent that elicits an immune response, and/or an agent that is bound by a T cell receptor (e.g., when presented by an MHC molecule) or to an antibody (e.g., produced by a B cell) when exposed or administered to an organism. In some embodiments, an antigen elicits a humoral response (e.g., including production of antigen-specific antibodies) in an organism. Alternatively, or additionally, in some embodiments, an antigen elicits a cellular response (e.g., involving T-cells whose receptors specifically interact with the antigen) in an organism. A particular antigen may elicit an immune response in one or several members of a target organism (e.g., mice, rabbits, primates, humans), but not in all members of the target organism species. In some embodiments, an antigen elicits an immune response in at least about 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% of the members of a target organism species. In some embodiments, an antigen binds to an antibody and/or T cell receptor, and may or may not induce a particular physiological response in an organism. In some embodiments, for example, an antigen may bind to an antibody and/or to a T cell receptor in vitro, whether or not such an interaction occurs in vivo. In some embodiments, an antigen reacts with the products of specific humoral or cellular immunity, including those induced by heterologous immunogens.

"Adjuvant," as used herein, refers to a substance or vehicle that non-specifically enhances the immune response to an antigen. Adjuvants can include, without limitation, a suspension of minerals (e.g., alum, aluminum hydroxide, or phosphate) on which antigen is adsorbed; a water-in-oil or oil-in-water emulsion in which antigen solution is emulsified in mineral oil or in water (e.g., Freund's incomplete adjuvant). Sometimes killed mycobacteria is included (e.g., Freund's complete adjuvant) to further enhance antigenicity. Immuno-stimulatory oligonucleotides (e.g., a CpG motif) can also be used as adjuvants (for example, see U.S. Pat. Nos. 6,194,388; 6,207,646; 6,214,806; 6,218,371; 6,239,116; 6,339,068; 6,406,705; and 6,429,199). Adjuvants can also include biological molecules, such as Toll-Like Receptor (TLR) agonists and costimulatory molecules. An adjuvant may be administered as a separate molecule in a composition or covalently bound (conjugated) to a particle.

An "antigenic RSV G polypeptide" is used herein to refer to a polypeptide comprising all or part of an RSV G amino acid sequence of sufficient length that the molecule is antigenic with respect to RSV. Antigenicity may be a feature of the RSV sequence as part of a construct further comprising a heterologous sequence, such as an α sequence. That is, if an RSV sequence is part of a construct further comprising a heterologous sequence, then it is sufficient that the construct can serve as an antigen that generates anti-RSV antibodies, regardless of whether the RSV sequence without the heterologous sequence could do so.

An "α sequence" is the sequence of SEQ ID NO: 9.

In some embodiments, an "antigenic RSV G α polypeptide" comprises a polypeptide having at least 80%, 85%, 90%, 95%, 99%, or 100% identity to SEQ ID NO: 6. In some embodiments, the antigenic RSV G α polypeptide comprises a single chain polypeptide comprising an RSV Gcc and SEQ ID NO: 9, or a fragment of SEQ ID NO: 9 capable of multimerizing the RSV Gcc. The antigenic RSV G α polypeptide may further comprise an immune-stimulatory moiety. Antigenicity may be a feature of the RSV G sequence as part of the larger construct. That is, it is sufficient that the construct can serve as an antigen against the RSV G polypeptide, regardless of whether the RSV G polypeptide without the α (and immune-stimulatory moiety if applicable) could do so. To be clear, however, an antigenic RSV G polypeptide does not need to comprise an α sequence. "Antigenic RSV G polypeptide" is used herein to refer to a polypeptide which may be either an antigenic RSV G α polypeptide or an antigenic RSV G polypeptide that does not comprise an α sequence.

As used herein, a "subject" refers to any member of the animal kingdom. In some embodiments, "subject" refers to humans. In some embodiments, "subject" refers to non-human animals. In some embodiments, subjects include, but are not limited to, mammals, birds, reptiles, amphibians, fish, insects, and/or worms. In certain embodiments, the non-human subject is a mammal (e.g., a rodent, a mouse, a rat, a rabbit, a monkey, a dog, a cat, a sheep, cattle, a primate, and/or a pig). In some embodiments, a subject may be a transgenic animal, genetically-engineered animal, and/or a clone. In certain embodiments of the present invention the subject is an adult, an adolescent or an infant. In some embodiments, terms "individual" or "patient" are used and are intended to be interchangeable with "subject."

As used herein, the term "vaccination" or "vaccinate" refers to the administration of a composition intended to generate an immune response, for example to a disease-causing agent. Vaccination can be administered before, during, and/or after exposure to a disease-causing agent, and/or to the development of one or more symptoms, and in some embodiments, before, during, and/or shortly after exposure to the agent. In some embodiments, vaccination includes multiple administrations, appropriately spaced in time, of a vaccinating composition.

The disclosure describes sequences having a certain degree of identity to a given nucleic acid sequence or amino acid sequence, respectively (a references sequence).

"Sequence identity" between two nucleic acid sequences indicates the percentage of nucleotides that are identical between the sequences. "Sequence identity" between two amino acid sequences indicates the percentage of amino acids that are identical between the sequences.

The terms "% identical", "% identity" or similar terms are intended to refer, in particular, to the percentage of nucleotides or amino acids which are identical in an optimal alignment between the sequences to be compared. Said percentage is purely statistical, and the differences between the two sequences may be but are not necessarily randomly distributed over the entire length of the sequences to be compared. Comparisons of two sequences are usually carried out by comparing said sequences, after optimal alignment, with respect to a segment or "window of comparison", in order to identify local regions of corresponding sequences. The optimal alignment for a comparison may be carried out manually or with the aid of the local homology algorithm by Smith and Waterman, 1981, Ads App. Math. 2, 482, with the aid of the local homology algorithm by Needleman and Wunsch, 1970, J. Mol. Biol. 48, 443, with the aid of the similarity search algorithm by Pearson and Lipman, 1988, Proc. Natl Acad. Sci. USA 88, 2444, or with the aid of computer programs using said algorithms (GAP, BESTFIT, FASTA, BLAST P, BLAST N and TFASTA in Wisconsin Genetics Software Package, Genetics Computer Group, 575 Science Drive, Madison, Wis.).

Percentage identity is obtained by determining the number of identical positions at which the sequences to be compared correspond, dividing this number by the number of positions compared (e.g., the number of positions in the reference sequence) and multiplying this result by 100.

In some embodiments, the degree of identity is given for a region which is at least about 50%, at least about 60%, at least about 70%, at least about 80%, at least about 90% or about 100% of the entire length of the reference sequence. For example, if the reference nucleic acid sequence consists of 200 nucleotides, the degree of identity is given for at least about 100, at least about 120, at least about 140, at least about 160, at least about 180, or about 200 nucleotides, in some embodiments in continuous nucleotides. In some embodiments, the degree of identity is given for the entire length of the reference sequence.

Nucleic acid sequences or amino acid sequences having a particular degree of identity to a given nucleic acid sequence or amino acid sequence, respectively, may have at least one functional property of said given sequence, e.g., and in some instances, are functionally equivalent to said given sequence. One important property includes the ability to act as a cytokine, in particular when administered to a subject. In some embodiments, a nucleic acid sequence or amino acid sequence having a particular degree of identity to a given nucleic acid sequence or amino acid sequence is functionally equivalent to said given sequence.

As used herein, the term "kit" refers to a packaged set of related components, such as one or more compounds or compositions and one or more related materials such as solvents, solutions, buffers, instructions, or desiccants.

B. Antigenic RSV G Polypeptides

Provided herein are antigenic RSV G polypeptides comprising more than two RSV Gcc polypeptides. In some embodiments, the Gcc polypeptides are Gcc monomers. In some embodiments, antigenic RSV G polypeptides comprising more than two RSV Gcc monomers are provided, wherein the polypeptide does not comprise ferritin. In some embodiments, an antigenic RSV G polypeptide is provided as a single chain, wherein the single chain comprises more than two RSV Gcc monomers. The RSV Gcc polypeptide/monomer may comprise the whole sequence of RSV Gcc or a portion of RSV Gcc. In some embodiments, the RSV Gcc is lacking the last one, two, or three amino acids. In some embodiments, the RSV Gcc is lacking the last amino acid (e.g., the K at the N-terminus of SEQ ID NO: 3). The RSV Gcc polypeptide may comprise modifications compared to a wildtype sequence (SEQ ID NO: 3), such as, for example, an N→S substitution at amino acid number 7 of SEQ ID NO: 3.

In some embodiments, the RSV Gcc polypeptide is from RSV A strain (UniProtKB/Swiss-Prot: P27022.1; SEQ ID NO: 1). In some embodiments, the RSV Gcc polypeptide is from RSV B strain (UniProtKB/Swiss-Prot: O36633.1; SEQ ID NO: 226). In some embodiments, the RSV Gcc polypeptide from strain A comprises the amino acids of SEQ ID NO: 3. In some embodiments, the RSV Gcc polypeptide from strain A comprises the amino acids of SEQ ID NO: 3, wherein the terminal K is of SEQ ID NO: 3 is not present. In some embodiments, the RSV Gcc polypeptide from strain A comprises amino acids 2-42 of SEQ ID NO: 4. In some embodiments, the RSV Gcc polypeptide from strain B comprises the amino acids of SEQ ID NO: 10. In some embodiments, the RSV Gcc polypeptide from strain B comprises amino acids 10-51 of SEQ ID NO: 8.

In some embodiments, the RSV Gcc polypeptide comprises all or part of the Gcc region (amino acids 151-193 of RSV G (SEQ ID NO: 1)). In some embodiments, the RSV G polypeptide comprises a CX3C motif. In some embodiments, the RSV G polypeptide binds to the CX3CR1 receptor.

In some embodiments, the RSV G polypeptide is not glycosylated. For example, an RSV G polypeptide can lack NXS/TX glycosylation sites, either due to truncation or mutation of N or S/T residues (e.g., to Q or A, respectively), or a combination thereof.

In some embodiments, an RSV G polypeptide comprises 3, 4, 5, 6, 7, 8, 9, or 10 Gcc monomers. In some embodiments, an RSV G polypeptide comprises 1-2, 1-5, 1-10, 1-20, 1-25, 1-30, 1-40, 1-50, 1-60, 1-70, 1-80, 1-90, 1-100, or 1-120 Gcc monomers. In some embodiments, an RSV G polypeptide comprises 3 Gcc monomers. In some embodiments, an RSV G polypeptide comprises 6 Gcc monomers. In some embodiments, an RSV G polypeptide comprises 120 Gcc monomers. In some embodiments, the antigenic RSV G polypeptide comprises Gcc monomers of strain A only. In some embodiments, the antigenic RSV G polypeptide comprises Gcc monomers of strain B only. In some embodiments, the antigenic RSV G polypeptide comprises Gcc monomers of strain A and strain B.

In some embodiments, the antigenic RSV G polypeptide comprises more than two Gcc monomers of strain A. In some embodiments, the antigenic RSV G polypeptide comprises more than two Gcc monomers of strain B. In some embodiments, the antigenic RSV G polypeptide comprises at least one Gcc monomer of strain A and at least one Gcc monomer of strain B. In some embodiments, the antigenic RSV G polypeptide comprises one Gcc monomer of strain A and one Gcc monomer of strain B. In some embodiments, the antigenic RSV G polypeptide comprises two Gcc monomers, both from strain A. In some embodiments, the antigenic RSV G polypeptide comprises two Gcc monomers, both from strain B. In some embodiments, the antigenic RSV G polypeptide is a single chain.

In some embodiments, the antigenic RSV G polypeptide comprises three Gcc monomers of strain A. In some embodiments, the antigenic RSV G polypeptide comprises three Gcc monomers of strain B. In some embodiments, the antigenic RSV G polypeptide comprises three Gcc monomers of strain A and three Gcc monomers of strain B.

In some embodiments, the antigenic RSV G polypeptide is a trimer, tetramer, or hexamer. In some embodiments, the antigenic RSV G polypeptide is a tetramer. In some embodiments, the trimer, tetramer, or hexamer is a single chain polypeptide. In some embodiments, the trimer, tetramer, or hexamer is a single chain polypeptide that does not form a particle. In some embodiments, the antigenic RSV G polypeptide is a tetramer comprising four Gcc monomers. In some embodiments, the antigenic RSV G polypeptide is a tetramer comprising four Gcc monomers, wherein two monomers of strain A and two monomers of strain B. In some embodiments, the antigenic RSV G polypeptide is a tetramer comprising four Gcc monomers, wherein two monomers of strain A and two monomers of strain B, wherein the polypeptide is a single chain and does not form a particle. In some embodiments, the antigenic RSV G polypeptide is a tetramer comprising the amino acids of SEQ ID NO: 5. In some embodiments, the antigenic RSV G polypeptide is a tetramer comprising an amino acid sequence that is 85%, 90%, 95%, or 99% identical to the amino acid sequence of SEQ ID NO: 5.

1. RSV G Particles

In some embodiments, an RSV G polypeptide particle or multimer is provided. In some embodiments, an RSV G polypeptide particle or multimer is provided, wherein the particle does not comprise ferritin. In some embodiments, an RSV G polypeptide single chain particle or multimer is provided. In some embodiments, an RSV G polypeptide particle or multimer is provided, comprising any of the RSV G polypeptides described herein and a multimerization domain. In some embodiments, the RSV G particle comprises 1, 2, 3, 4, 5, 6, 7, 8, 9, or 10 multimerization domains. In some embodiments, an RSV G polypeptide comprises 1-2, 1-5, 1-10, 1-20, 1-25, 1-30, 1-40, 1-50, 1-60, 1-70, 1-80, 1-90, 1-100, or 1-120 multimerization domains. In some embodiments, an RSV G polypeptide comprises 3 Gcc multimerization domains. In some embodiments, an RSV G polypeptide comprises 6 Gcc multimerization domains. In some embodiments, an RSV G polypeptide comprises 120 Gcc multimerization domains.

In some embodiments, the RSV G particle comprises 1 multimerization domain. In some embodiments, the multimerization domain is any domain known in the art to self-assemble. In some embodiments, the multimerization domain is a foldon domain. In some embodiments, the foldon domain comprising SEQ ID NO: 11, or a portion of SEQ ID NO: 11 capable of self-assembling. In some embodiments, the foldon domain comprises a sequence that is 80%, 90%, 95%, or 99% identical to SEQ ID NO: 11, wherein the foldon is capable of self-assembling. An exemplary portion of SEQ ID NO: 11 is provided as SEQ ID NO:

13. In some embodiments, the foldon domain comprises a sequence that is 80%, 90%, 95%, or 99% identical to SEQ ID NO: 13, wherein the foldon is capable of self-assembling. In some embodiments, the foldon domain comprises or consists of the sequence of SEQ ID NO: 13.

In some embodiments, the antigenic RSV G polypeptide comprises a sequence having at least 85%, 90%, 95%, 97%, 98%, 99%, or 99.5% identity to amino acids SEQ ID NO: 4 (B1-A2 foldon, with the foldon of SEQ ID NO: 11). In some embodiments, the RSV G polypeptide comprises the sequence of SEQ ID NO: 4. In some embodiments, the antigenic RSV G polypeptide comprises a sequence having at least 85%, 90%, 95%, 97%, 98%, 99%, or 99.5% identity to amino acids SEQ ID NO: 14 (B1-A2 foldon, with the foldon of SEQ ID NO: 13). In some embodiments, the RSV G polypeptide comprises the sequence of SEQ ID NO: 14.

In some embodiments, the antigenic RSV G polypeptide comprises a sequence having at least 85%, 90%, 95%, 97%, 98%, 99%, or 99.5% identity to amino acids SEQ ID NO: 7 (A2-A2 foldon). In some embodiments, the RSV G polypeptide comprises the sequence of SEQ ID NO: 7.

In some embodiments, the antigenic RSV G polypeptide comprises a sequence having at least 85%, 90%, 95%, 97%, 98%, 99%, or 99.5% identity to amino acids SEQ ID NO: 8 (B1-B1 foldon). In some embodiments, the RSV G polypeptide comprises the sequence of SEQ ID NO: 8.

In some embodiments, the RSV G particle is an antigenic RSV G α particle. For example, the RSV G polypeptide may comprise a single chain polypeptide comprising an RSV Gcc from strain A, B, or both A and B, as described herein, and a full or partial α sequence. In some embodiments, the antigenic RSV G polypeptide comprises a sequence having at least 85%, 90%, 95%, 97%, 98%, 99%, or 99.5% identity to SEQ ID NO: 6 (a particle). In some embodiments, the RSV G polypeptide comprises the sequence of SEQ ID NO: 6. In some embodiments, the antigenic α particle is capable of self-assembling. In some embodiments, the antigenic α particle comprises an RSV Gcc and a sequence that is 80%, 90%, 95%, or 99% identical to SEQ ID NO: 9, wherein the particle is capable of self-assembling. In some embodiments, the antigenic α particle displays 60 copies of particle protomer per particle, wherein 2 Gcc's (optionally, one strain A and one strain B) are multimerized so that approximately 120 Gcc's are displayed and available for immune recognition.

In some embodiments, the RSV polypeptide is a single chain construct, e.g., expressed as single polypeptides.

In some embodiments, an RSV Gcc comprises a single amino acid substitution relative to a wild-type sequence. In some embodiments, an RSV Gcc comprises more than one single amino acid substitution, e.g., 2, 3, 4, 5, or 6 substitutions relative to a wild-type sequence. An exemplary wild-type sequence is SEQ ID NO: 3.

C. Linkers

In some embodiments, a linker separates the amino acid sequence of the RSV monomers and/or multimerization domain, if present. Any linker may be used. In some embodiments, the linker is a peptide linker, which can facilitate expression of the antigenic RSV G polypeptide as a fusion polypeptide (e.g., from a single open reading frame). In some embodiments, the linker is a glycine-serine linker. In some embodiments, the glycine-serine linker is GS, GGGS (SEQ ID NO: 15), 2XGGGS (i.e., GGGSGGGS) (SEQ ID NO: 16), or 5XGGGS (SEQ ID NO: 17).

In some embodiments, the linker is 2, 3, 4, 5, 6, 7, 8, 9, or 10 amino acids in length. In some embodiments, the linker is about 2-4, 2-6, 2-8, 2-10, 2-12, or 2-14 amino acids in length. In some embodiments, the linker is at least 15 amino acids in length. In some embodiments, the linker is at least 25 amino acids in length. In some embodiments, the linker is at least 30 amino acids in length. In some embodiments, the linker is at least 35 amino acids in length. In some embodiments, the linker is at least 40 amino acids in length. In some embodiments, the linker is less than or equal to 60 amino acids in length. In some embodiments, the linker is less than or equal to 50 amino acids in length. In some embodiments, the linker is about 16, 28, 40, 46, or 47 amino acids in length. In some embodiments, the linker is flexible.

In some embodiments, the linker comprises glycine (G) and/or serine (S) amino acids. In some embodiments, the linker comprises or consists of glycine (G), serine (S), asparagine (N), and/or alanine (A) amino acids, and optionally a cysteine as discussed above. In some embodiments, the linker comprises an amino acid sequence with at least 80%, 85%, 90%, 95%, 97%, 98%, 99%, or 100% identity to SEQ ID NO: 222. In some embodiments, the linker comprises GGGGSGGGGSGGGGSG (SEQ ID NO: 220), GGSGSGSNSSASSGASSGGASGGSGGSG (SEQ ID NO: 221), GGSGSASSGASASGSSNGSGSGSGSNSSASS-GASSGGASGGSGGSG (SEQ ID NO: 222), or GS. In some embodiments, the linker comprises FR1 (SEQ ID NO: 223) or FR2 (SEQ ID NO: 224).

In some embodiments, a construct does not comprise a linker. In some embodiments, a construct comprises one linker. In some embodiments, a construct comprises two or more than two linkers. In some embodiments, the construct comprises a linker between each monomer and between a monomer and multimerization domain, if present.

D. Compositions; Uses and Methods for Vaccination

In some embodiments, the invention provides methods of immunizing a subject against infection with RSV. The invention further provides methods of eliciting an immune response against RSV in a subject. In some embodiments, the methods comprise administering to the subject an effective amount of a pharmaceutical composition described herein to a subject. In some embodiments, the methods comprise administering to the subject an effective amount of an antigenic RSV polypeptide, antigenic RSV G particle, or antigenic RSV a particle described herein to a subject.

In some embodiments, a composition comprising any one or more of the polypeptides or particles described herein and a pharmaceutically acceptable vehicle, adjuvant, or excipient is provided.

In some embodiments, a polypeptide, particle, or composition described herein is administered to a subject, such as a human, to immunize against infection caused by RSV. In some embodiments, a polypeptide, nanoparticle, or composition described herein is administered to a subject, such as a human, to produce a protective immune response to future infection with RSV. In some embodiments, any one or more of the polypeptides, nanoparticle, or compositions described herein are provided for use in immunizing against infection caused by RSV. In some embodiments, any one or more of the polypeptides, nanoparticle, or compositions described herein are provided for use in producing a protective immune response to future infection with RSV. In some embodiments, the protective immune response decreases the incidence of infection with RSV, pneumonia, bronchiolitis, or asthma.

In some embodiments, a composition comprises an RSV G polypeptide described herein. In some embodiments, a composition comprises an RSV G particle described herein.

In some embodiments, a composition comprising an RSV G polypeptide described herein elicits a superior neutralizing response to RSV compared to immunization with a post-fusion RSV F polypeptide or Gcc-NP. In some embodiments, immunization with an RSV G polypeptide described herein (e.g., a polypeptide or particle comprising an RSV G polypeptide described herein) elicits a higher titer of antibodies directed against RSV G compared to immunization with Gcc-NP. In some embodiments, immunization with an RSV G polypeptide described herein elicits a higher ratio of total antibody being directed against RSV G compared to immunization with a one or two monomers of Gcc or Gcc-NP. Immunization with an RSV antigen described herein may provide better protection against RSV compared to immunization with a post-fusion RSV F.

In some embodiments, a composition comprising an RSV G polypeptide comprising more than two Gcc monomers, and the Gcc particles described herein elicits a neutralizing response to RSV.

In some embodiments, a composition comprising an RSV G polypeptide comprising more than two Gcc monomers, and the Gcc particles described herein, provide improved protection against RSV, e.g., a higher neutralizing titer than a composition that does not comprise more than two Gcc monomers.

1. Subjects

In some embodiments, the subject is a mammal. In some embodiments, the subject is a human.

In some embodiments, the subject is an adult (greater than or equal to 18 years of age). In some embodiments, the subject is a child or adolescent (less than 18 years of age). In some embodiments, the subject is elderly (greater than 60 years of age). In some embodiments, the subject is a non-elderly adult (greater than or equal to 18 years of age and less than or equal to 60 years of age).

In some embodiments, more than one administration of the composition is administered to the subject. In some embodiments, a booster administration improves the immune response.

In some embodiments, any one or more of the antigenic polypeptides, or compositions described herein are for use in a mammal, such as a primate (e.g., non-human primate, such as a monkey (e.g., a macaque, such as rhesus or cynomolgus) or ape), rodent (e.g., mouse or rat), or domesticated mammal (e.g., dog, rabbit, cat, horse, sheep, cow, goat, camel, or donkey). In some embodiments, any one or more of the antigenic polypeptides, or compositions described herein are for use in a bird, such as a fowl (e.g., chicken, turkey, duck, goose, guineafowl, or swan).

2. Adjuvants

As described herein, adjuvants may also be administered together with the antigenic RSV G polypeptides and particles described herein to a subject. In some embodiments, administration of adjuvant together with the polypeptide and particles produces a higher titer of antibodies against the RSV polypeptide in the subject as compared to administration of the polypeptide or particle alone, without the adjuvant. An adjuvant may promote earlier, more potent, or more persistent immune response to the antigenic polypeptide.

In some embodiments, a composition comprises one adjuvant. In some embodiments, a composition comprises more than one adjuvant. In some embodiments, a composition does not comprise an adjuvant.

In some embodiments, an adjuvant comprises aluminum. In some embodiments, an adjuvant is aluminum phosphate. In some embodiments, an adjuvant is Alum (Alyhydrogel '85 2%; Brenntag—Cat#21645-51-2).

In some embodiments, an adjuvant is an organic adjuvant. In some embodiments, an adjuvant is an oil-based adjuvant. In some embodiments, an adjuvant comprises an oil-in-water nanoemulsion.

In some embodiments, an adjuvant comprises squalene. In some embodiments, the adjuvant comprising squalene is Ribi (Sigma adjuvant system Cat #S6322-1vl), Addavax™, MF59, AS03, or AF03 (see U.S. Pat. No. 9,703,095). In some embodiments, the adjuvant comprising squalene is a nanoemulsion.

In some embodiments, an adjuvant comprises a polyacrylic acid polymer (PAA). In some embodiments, the adjuvant comprising PAA is SPA09 (see WO 2017218819).

In some embodiments, an adjuvant comprises non-metabolizable oils. In some embodiments, the adjuvant is Incomplete Freund's Adjuvant (IFA).

In some embodiments, an adjuvant comprises non-metabolizable oils and killed *Mycobacterium tuberculosis*. In some embodiments, the adjuvant is Complete Freund's Adjuvant (CFA).

In some embodiments, an adjuvant is a lipopolysaccharide. In some embodiments, an adjuvant is monophosphoryl A (MPL or MPLA).

3. Pharmaceutical Compositions

In various embodiments, a pharmaceutical composition comprising an antigenic RSV G polypeptide described herein is provided. In some embodiments, the pharmaceutical composition is an immunogenic composition (e.g., a vaccine) capable of eliciting an immune response such as a protective immune response against a pathogen.

For example, in some embodiments, the pharmaceutical compositions may comprise one or more of the following: (1) an antigenic RSV G polypeptide comprising more than two RSV Gcc monomers; (2) an antigenic α polypeptide; (3) an antigenic RSV G particle; or (4) an antigenic RSV particle or non-particle trimer, tetramer, or hexamer. In some embodiments, the pharmaceutical composition comprises an antigenic RSV G polypeptide comprising more than two RSV Gcc monomers.

In some embodiments, the present invention provides pharmaceutical compositions comprising antibodies or other agents related to the antigenic polypeptides described herein. In an embodiment, the pharmaceutical composition comprises antibodies that bind to and/or compete with an antigenic polypeptide described herein. Alternatively, the antibodies may recognize viral particles comprising the RSV polypeptide component of an antigenic polypeptide described herein.

In some embodiments, the pharmaceutical compositions as described herein are administered alone or in combination with one or more agents to enhance an immune response, e.g., an adjuvant described above. In some embodiments, a pharmaceutical composition further comprises an adjuvant described above.

In some embodiments, the pharmaceutical composition further comprises a pharmaceutically acceptable carrier or excipient. As used herein, the term "carrier" refers to a diluent, adjuvant, excipient, or vehicle with which a pharmaceutical composition is administered. In exemplary embodiments, carriers can include sterile liquids, such as, for example, water and oils, including oils of petroleum, animal, vegetable, or synthetic origin, such as, for example, peanut oil, soybean oil, mineral oil, sesame oil and the like. In some embodiments, carriers are or include one or more solid components. Pharmaceutically acceptable carriers can also include, but are not limited to, saline, buffered saline, dextrose, glycerol, ethanol, and combinations thereof. As used herein, an excipient is any non-therapeutic agent that may be included in a pharmaceutical composition, for example to provide or contribute to a desired consistency or stabilizing effect. Suitable pharmaceutical excipients include, but are not limited to, starch, glucose, lactose, sucrose, gelatin, malt, rice, flour, chalk, silica gel, sodium stearate, glycerol monostearate, talc, sodium chloride, dried skim milk, glycerol, propylene, glycol, water, ethanol and the like. In various embodiments, the pharmaceutical composition is sterile.

In some embodiments, the pharmaceutical composition contains minor amounts of wetting or emulsifying agents, or pH buffering agents. In some embodiments, the pharmaceutical compositions of may include any of a variety of additives, such as stabilizers, buffers, or preservatives. In addition, auxiliary, stabilizing, thickening, lubricating, and coloring agents can be included.

In various embodiments, the pharmaceutical composition may be formulated to suit any desired mode of administration. For example, the pharmaceutical composition can take the form of solutions, suspensions, emulsion, drops, tablets, pills, pellets, capsules, capsules containing liquids, gelatin capsules, powders, sustained-release formulations, suppositories, emulsions, aerosols, sprays, suspensions, lyophilized powder, frozen suspension, desiccated powder, or any other form suitable for use. General considerations in the formulation and manufacture of pharmaceutical agents may be found, for example, in Remington's Pharmaceutical Sciences, 19th ed., Mack Publishing Co., Easton, PA, 1995; incorporated herein by reference.

The pharmaceutical composition can be administered via any route of administration. Routes of administration include, for example, oral, intradermal, intramuscular, intraperitoneal, intravenous, subcutaneous, intranasal, mucosal, epidural, sublingual, intranasal, intracerebral, intravaginal, transdermal, rectally, by intratracheal instillation, bronchial instillation, inhalation, or topically. Administration can be local or systemic. In some embodiments, administration is carried out orally. In another embodiment, the administration is by parenteral injection. The mode of administration can be left to the discretion of the practitioner.

In some embodiments, the pharmaceutical composition is suitable for parenteral administration (e.g. intravenous, intramuscular, intraperitoneal, and subcutaneous). Such compositions can be formulated as, for example, solutions, suspensions, dispersions, emulsions, and the like. They may also be manufactured in the form of sterile solid compositions (e.g. lyophilized composition), which can be dissolved or suspended in sterile injectable medium immediately before use. For example, parenteral administration can be achieved by injection. In such embodiments, injectables are prepared in conventional forms, i.e., either as liquid solutions or suspensions, solid forms suitable for solution or suspension in liquid prior to injection, or as emulsions. In some embodiments, injection solutions and suspensions are prepared from sterile powders, lyophilized powders, or granules.

In a further embodiment, the pharmaceutical composition is formulated for delivery by inhalation (e.g., for direct delivery to the lungs and the respiratory system). For example, the composition may take the form of a nasal spray or any other known aerosol formulation. In some embodiments, preparations for inhaled or aerosol delivery comprise a plurality of particles. In some embodiments, such preparations can have a mean particle size of about 1, about 2, about 3, about 4, about 5, about 6, about 7, about 8, about 9, about 10, about 11, about 12, or about 13 microns. In some embodiments, preparations for inhaled or aerosol delivery are formulated as a dry powder. In some embodiments, preparations for inhaled or aerosol delivery are formulated as a wet powder, for example through inclusion of a wetting agent. In some embodiments, the wetting agent is selected from the group consisting of water, saline, or other liquid of physiological pH.

In some embodiments, the pharmaceutical composition in accordance with the invention are administered as drops to the nasal or buccal cavity. In some embodiments, a dose may comprise a plurality of drops (e.g., 1-100, 1-50, 1-20, 1-10, 1-5, etc.).

The present pharmaceutical composition may be administered in any dose appropriate to achieve a desired outcome. In some embodiments, the desired outcome is the induction of a long-lasting adaptive immune response against the source of an RSV polypeptide present in an antigenic particle present in the composition. In some embodiments, the desired outcome is a reduction in the intensity, severity, frequency, and/or delay of onset of one or more symptoms of infection. In some embodiments, the desired outcome is the inhibition or prevention of infection. The dose required will vary from subject to subject depending on the species, age, weight, and general condition of the subject, the severity of the infection being prevented or treated, the particular composition being used, and its mode of administration.

In some embodiments, pharmaceutical compositions in accordance with the invention are administered in single or multiple doses. In some embodiments, the pharmaceutical compositions are administered in multiple doses administered on different days (e.g., prime-boost vaccination strategies). In some embodiments, the pharmaceutical composition is administered as part of a booster regimen.

In various embodiments, the pharmaceutical composition is co-administered with one or more additional therapeutic agents. Co-administration does not require the therapeutic agents to be administered simultaneously, if the timing of their administration is such that the pharmacological activities of the additional therapeutic agent and the active ingredient(s) in the pharmaceutical composition overlap in time, thereby exerting a combined therapeutic effect. In general, each agent will be administered at a dose and on a time schedule determined for that agent.

4. Nucleic Acid/mRNA

Also provided is a nucleic acid encoding an antigenic polypeptide or particle described herein. In some embodiments, the nucleic acid is an mRNA. Any nucleic acid capable of undergoing translation resulting in a polypeptide is considered an mRNA for purposes of this disclosure.

5. Kits

Also provided herein are kits comprising one or more antigenic polypeptides, nucleic acids, antigenic particles, compositions, or pharmaceutical compositions described herein. In some embodiments, a kit further comprises one or more of a solvent, solution, buffer, instructions, or desiccant.

TABLE 1

(Sequence Table): Description of the Sequences

| Description | Sequence | SEQ ID NO |
|---|---|---|
| RSV G A strain Native UniProtKB/Swiss-Prot: P27022.1 | MSKNKDQRTAKTLERTWDTLNHLLFISSCLYKLNLKSVAQITLSILAMIISTSLIIVAIIFIASANHKIT STTTIIQDATNQIKNTTPTYLTQNPQLGISPSNPDITSLITTILDSTTPGVKSTLQSTTVGTKNTTTQ AQPNKPTTKQRQNKPPSKPNNDFHFEVFNFVPCSICSNNPTCWAICKRIPNKPGKRTTTKPTKPTPKT TKKGPKPQTTKSKEAPTTKPTEEPTINTTKTNIITTLLTSNTTRNPELTSQMETFHSTSSEGNPSPSQVS ITSEYPSQPSSPPNTPR | 1 |
| RSV G ectodomain, residues 66-297 | NHKVLTTAIIQDATSQIKNTTPTYLTQDPQLGISPSNLSEITSQTTTILASTTPGVKSNLQPTTVKTKNTTTTQQPSKPTTKQRQN KPPNKPNNDFHFEVFNFVPCSICSNNPTCWAICKRIPNKPTKKPTKTTKKPTFKTTKKDHKPQTTKPKEVPTTKPTEEPTINTTKT NIITTLLTNNTTGNPKLTSQMETFHSTSSEGNLSPSQVSTTSEHPSQPSSPNTTRQ | 2 |
| RSV Gcc (central conserved region) A2 strain res 151-193. As described in Murata et al. (2010) Vaccine 28:6242-6246 at FIG. 1. | RQNKPPNKPNNDFHFEVFNFVPCSICSNNPTCWAICKRIPNKK | 3 |
| RSV Gcc B1-A2-foldon strain chimera sequence | MEEESEESGGRKNPPKKPKDDYHFEVFNFVPCSICGNNQLCKSICKTIPNKKEEEESEESGGrqnkppskpnndfhfevfnfvpcsic snnptcwaickripnkkeeessggsgggsggggsggsssaiggyipeaprdgqayvrkdgewvllstflgsglevlfqgplehh hhhh | 4 |
| RSV Gcc tetramer, A2-B1-A2-B1 strain chimera | MrqnkppskpnndhfevfnfvpcsicsnnptcwaickripnkRKNPPKKPKDDYHFEVFNFVPCSICGNNQLCKSICKTIPNKKrqn kppskpnndfhfevfnfvpcsicsnnptcwaickripnkRKNPPKKPKDDYHFEVFNFVPCSICGNNQLCKSICKTIPNKK | 5 |
| RSV Gcc A2-α-B1 chimera particle | MEEESEESGGrqnkppskpnndfhfevfnfvpcsicsnnptcwaickripnkEEEESEESGGSGSWEEWNAKWDEWRNDQNDWREDWQ AWRDDWAYWTLTWRYGELYSRLARIERRVEELRRLLQLIRHENRMVLQFVRALSMQARRLESKLEEEESEESGGRKNPPKKPKDDYH FEVFNFVPCSICGNNQLCKSICKTIPNKKEEESESGG | 6 |
| RSV Gcc A2-A2-foldon strain chimera sequence | meeseesggrqnkppskpnndfhfevfnfvpcsicsnnptcwaickripnkkeeessggsgggsgggssaiggyipeaprdgqayvrkdgewvllstflgsglevlfqgpleh hhhhh | 7 |
| RSV Gcc B1-B1-foldon strain chimera sequence | MEEESEESGGRKNPPKKPKDDYHFEVFNFVPCSICGNNQLCKSICKTIPNKKeeessggsgggsgggsgggssaiggyipeaprdgqayvrkdgewvllstflgsglevlfqgpplehhhh | 8 |
| α sequence | DEWRNDQNDWREDWQAMRDDWAYWTLTWRYGELYSRLARIERRVEELRRLLQLIRHENRMVLQFVRALSMQARR | 9 |
| RSV Gcc (central conserved region) B1 strain res 151-193. As described in Murata et al. (2010) Vaccine 28:6242-6246 at FIG. 1. | RLKNPPKKPKDDYHFEVFNFVPCSICGNNQLCKSICKTIP | 10 |
| Foldon | aiggyipeaprdgqayvrkdgewvllstflgsglevlfqgple | 11 |
| RSV G peptide A2 (aa 151-193) for conjugation with N-terminal Azido linker and flanking glutamates | Azido-PEG4-SGGSGSSEEEGGSRQNKPNKPNNDFHFEVFNFVPCSICSNNPTCWAICKRIPNKKEEE | 12 |

TABLE 1-continued (Sequence Table): Description of the Sequences

| Description | Sequence | SEQ ID NO |
|---|---|---|
| 30 amino acid foldon | aiggyipeaprdgqayvrkdgewvllstfl | 13 |
| RSV Gcc B1-A2-30 aa foldon strain chimera sequence | MEEESSGGRKNPPKKPKDDYHFEVFNFVPCSICGNNQLCKSICKTIPNKKEEEESEESGGrqmkppskpnndfhfevfnfvpcsic snnptcwaichripnhkeeessgggsgggsggggsggsssaiggyipeaprdgqayvrkdgewvllstfl | 14 |
| bfpFerritin-N19Q/C31S/S26C | ESQVRQQFSKDIEKLLNEQVNKEMQSSNLYMCMSSWSYTHSLDGAGLFLFDHAAEEYEHAKKLIIFLNENNVPVQLTSISAPEHKFPEG LTQIFQKAYEHEQHISESINNIVDHAIKSKDHATFNFLQWYVAEQHEEEVLFKDILDKIELIGNENHGLYLADQYVKGIAKSRKS | 201 |
| bfpFerritin-N19Q/C31S/S72C | ESQVRQQFSKDIEKLLNEQVNKEMQSSNLYMSMSWSYTHSLDGAGLFLFDHAAEEYEHAKKLIIFLNENNVPVQLTCISAPEHKFPEG LTQIFQKAYEHEQHISESINNIVDHAIKSKDHATFNFLQWYVAEQHEEEVLFKDILDKIELIGNENHGLYLADQYVKGIAKSRKS | 202 |
| bfpFerritin-N19Q/C31S/A75C | ESQVRQQFSKDIEKLLNEQVNKEMQSSNLYMSMSWSYTHSLDGAGLFLFDHAAEEYEHAKKLIIFLNENNVPVQLTSISCPEHKFPEG LTQIFQKAYEHEQHISESINNIVDHAIKSKDHATFNFLQWYVAEQHEEEVLFKDILDKIELIGNENHGLYLADQYVKGIAKSRKS | 203 |
| bfpFerritin-N19Q/C31S/K79C | ESQVRQQFSKDIEKLLNEQVNKEMQSSNLYMSMSWSYTHSLDGAGLFLFDHAAEEYEHAKKLIIFLNENNVPVQLTSISAPEHCFPEG LTQIFQKAYEHEQHISESINNIVDHAIKSKDHATFNFLQWYVAEQHEEEVLFKDILDKIELIGNENHGLYLADQYVKGIAKSRKS | 204 |
| bfpFerritin-N19Q/C31S/S100C | ESQVRQQFSKDIEKLLNEQVNKEMQSSNLYMSMSWSYTHSLDGAGLFLFDHAAEEYEHAKKLIIFLNENNVPVQLTSISAPEHKFPEG LTQIFQKAYEHEQHISECINNIVDHAIKSKDHATFNFLQWYVAEQHEEEVLFKDILDKIELIGNENHGLYLADQYVKGIAKSRKS | 205 |
| bfpFerritin-N19Q/C31S/S111C | ESQVRQQFSKDIEKLLNEQVNKEMQSSNLYMSMSWSYTHSLDGAGLFLFDHAAEEYEHAKKLIIFLNENNVPVQLTSISAPEHKFPEG LTQIFQKAYEHEQHISESINNIVDHAIKCKDHATFNFLQWYVAEQHEEEVLFKDILDKIELIGNENHGLYLADQYVKGIAKSRKS | 206 |
| bfpFerritin-N19Q/C31S/E12C | ESQVRQQFSKDIEKLLNCQVNKEMQSSNLYMSMSWSYTHSLDGAGLFLFDHAAEEYEHAKKLIIFLNENNVPVQLTSISAPEHKFPEG LTQIFQKAYEHEQHISESINNIVDHAIKSKDHATFNFLQWYVAEQHEEEVLFKDILDKIELIGNENHGLYLADQYVKGIAKSRKS | 207 |
| Exemplary H. pylori Ferritin with bullfrog linker | ESQVRQQFSKDIEKLLNEQVNKEMNSSNLYMSMSSWCYTHSLDGAGLFLFDHAAEEYEHAKKLIIFLNENNVPVQLTSISAPEHKFPEG LTQIFQKAYEHEQHISESINNIVDHAIKSKDHATFNFLQWYVAEQHEEEVLFKDILDKIELIGNENHGLYLADQYVKGIAKSRKS | 208 |
| Exemplary wild-type H. pylori ferritin (GenBank Accession AAD06160.1) (without bullfrog linker or N-terminal Met) | LSKDIIKLLNEQVNKEMNSSNLYMSMSSWCYTHSLDGAGLFLFDHAAEEVLFKDILKEILGNENHGLYLADQYVKGIAKSRKS AYEHEQHISESINNIVDHAIKSKDHATFNFLQWYVAEQHEEEVLFKDILKEILGNENHGLYLADQYVKGIAKSRKS | 209 |
| CpG (ISS-1018) | TGACTGTGAACGTTCGAGATGA | 210 |
| Trichoplusia ni heavy chain ferritin | TQCNVNPVQIPKDWITMHRSCRNSMRQQIQMEVGASLQYLAMGAHPSKDVVNRPGPAQLFDAASEREHAMKLIEYLLMRGELTNDV SSLLQVRPPTRSSWKGGVEALEHALSMESDVTKSIRNVIKACEDDSEFNDYHLVDYLTGDFLEEQYKGQRDLAGKASTLKKLMDRHEA LGEFIFDKKLLGIDV | 211 |
| Trichoplusia ni light chain ferritin | ADTCYNDVALDCGITSNSLALPRCNAVYGEYGSHGNVATELQAYAKIHLERSYDYLLSAAYFNNYQTNRAGFSKLFKKLSDEAWSKTI DIIKHVTKRGDKMNFPDQHSTMKTERKNYTAENHELEALAKALDTQKELAERAFYIHREATRNSQHLHDPEIAQYLEEEFIEDHAEKIR TLAGHTSDLKKFITANNGHDLSLALYVFDEYLQKTV | 212 |
| Pyrococcus furiosus ferritin | MLSERMLKALNDQLNRELYSAYLYFAMAAYPEDLGLEGFANWMKAQAEEEIGHALRFYNY IYDRNGRVELDEIPKPPKEWESPLKAFEAAYEHEKFISKSIYELAALAEEEKDYSTRAFL EWFINEQVEEEASVKKILDKLKFAKDSPQILFMLDKELSARAPKLPGLLMQGGE | 213 |

TABLE 1-continued (Sequence Table): Description of the Sequences

| Description | Sequence | SEQ ID NO |
|---|---|---|
| human heavy chain ferritin | MTTASTSQVRQNYHQDSEAAINRQINLELYASYVLSMSYFDRDDVALKNFAKYFLHQSHEERBHAEKLMKLQNQRGGRIFLQDIKK PDCDDWESGLNAMECALHLEKNVQQSLLELHKLATDKNDPHLCDFIETHYLNEQVKAIKELGDHVTNLRKMGAPESGLAEYLFDKHTL GDSDQES | 214 |
| human light chain ferritin (signal peptide is underlined) | MDSKGSSQKGSRLLLIVVSNLLLPQGVLASSQIRQNYSTDVEEAAVNSLVNLYLQASYTYLSLGFYFDRDDVALEGVSHFRRELAEEK REGYERLLKMQNQRGRALFQDIKKPAEDEWGKTPDAMKAAMALEKKLNQALLDLHALGSARTDPHLCDFLETHFLDEEVKLIKKMGD HLTNLHRLGGPEAGLGEYLFERLITLKHD | 215 |
| lumazine synthase from Aquifex aeolicus | MQIYEGKLTAEGLRFGIVASRPNHALVDRLVEGAIDCIVRHGGREEDITLVRVPGSWEIPVAAGELARKEDIDAVIAIGVLIRGATPH FDYIASEVSKGLANLSLELRKPITFGVITADTLEQAIERAGTKHGNKGWEAALSAIEMANLFKSLR | 216 |
| bullfrog linker | ESQVRQQF | 217 |
| Cysteine-Thrombin-His Linker (cysteine in double underlined) | <u>C</u>LVPRGSLEHHHHHH | 218 |
| E. coli 6, 7-dimethyl-8-ribityllumazine synthase | MNIIEANVATPDARVAITIARPNNFINDSLLEGAIDALKRIGQVKDENITVVWVPGAYELPLAAGALAKTGKYDAVIALGTVIRGTA HFEYVAGGASNGLAHVAQDSEIPVAFGVLTTESIEQAIERAGTKAGNKGAEAALTALEMINVLKAIKA | 219 |
| 16 amino acid linker | GGGGSGGGGSGGGGSG | 220 |
| 28 amino acid linker | GGSGGSNSSASSGASSGASGASGGSGGSG | 221 |
| 46 amino acid linker | GGSGGSASSGASGASGSNGSGSGSGNSSASSGASSGGASGGSGGSG | 222 |
| FR1 | GGSGSASAEAAAKEAAAKAGGSGGSG | 223 |
| FR2 | GGSGSASAEAAAKEAAAKEAAAKASGGSGGSG | 224 |
| Not used | | 225 |
| RSV G B strain Native UniProtKB/Swiss-Prot: 036633.1 | MSKHKNQRTARTLEKTWDTLNHLIVISSCLYRLN This description and exemplary embodiments should not be taken as limiting. For the purposes of this specification and appended claims, unless otherwise indicated, all numbers expressing quantities, percentages, or proportions, and other numerical values used in the specification and claims, are to be understood as being modified in all instances by the term "about," to the extent they are not already so modified. "About" indicates a degree of variation that does not substantially affect the properties of the described subject matter, e.g., within 10%, 5%, 2%, or 1%. Accordingly, unless indicated to the contrary, the numerical parameters set forth in the following specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

EXAMPLES

The following examples are provided to illustrate certain disclosed embodiments and are not to be construed as limiting the scope of this disclosure in any way.

1. Preparation of Chimera RSV G Antigens

Vectors encoding RSV G chimera polypeptides (i.e., B1-A2-foldon (SEQ ID NO: 4), Gcc tetramer A2-B1-A2-B1 (SEQ ID NO: 5) and A2-α-B1 particle (SEQ ID NO: 6)) were synthesized by Genscript using the pET28 *E. coli* expression vector, which harbors the IPTG-inducible expression promoter. Modeled structures of the antigens are shown in FIG. 2A-C. The A2-α-B1 particle is expected to comprise 60 protomers, each comprising an A2 Gcc and a B1 Gcc, for ~120 displayed instances of Gcc epitope. Chimeric polypeptides were expressed in *E. coli* using standard methods in the field. Briefly, BL21 DE3 *E. coli* cells were transformed with the relevant vector, grown in LB Broth with 0.1% Kanamycin at 37° C. (typically 1 liter expression volumes) and induced with 0.1% IPTG when cell density was around 0.5-0.8 absorbance units (UV 600). Cultures were left overnight (approximately 16 hours) at 18° C. for polypeptide expression. Cells were harvested by centrifugation and the cell pellet was re-suspended in 30 mL PBS and sonicated. Samples were centrifuged 30 mins at 4,000 rpm, supernatant was discarded and retain inclusion bodies and re-suspended in 30 mL of 4 M Urea, followed by sonication. Samples were centrifuged once more and supernatant containing RSV G construct was dialyzed overnight against 4 liters of PBS. Soluble samples were then filtered using 0.22 μm Millex-GP Filter to obtain clear supernatant for polypeptide purification.

HIS-tagged constructs (i.e. B1-A2-foldon (SEQ ID NO: 4)) were initially purified using Ni chelation using GE Healthcare HISTRAP columns, eluting with a gradient of imidazole. Non-HIS-tagged constructs (i.e. Gcc tetramer A2-B1-A2-B1 (SEQ ID NO: 5) and A2-α-B1 particle (SEQ ID NO: 6)) were initially purified using ion exchange GE Healthcare HiTrap Q column with NaCl elution. Fractions containing RSV G constructs were further purified over reverse phase HPLC using a Kinetex 5u C18 100A column to further purify the construct and reduce endotoxin. Finally, RSV G constructs were purified by size exclusion purification using the GE Healthcare Superdex P200 column with Tris Buffered Saline mobile phase. Purity was judged by SDS-PAGE gel and concentration was judged by UV280 absorption, typical in the field.

To demonstrate that the ferritin nanoparticle can be used to improve the immunogenicity of the RSV G central domain antigen we developed a method of chemically conjugating the Gcc peptide (SEQ ID NO: 12) to the ferritin nanoparticle. Ferritin harboring the S111C mutation described herein (SEQ ID NO: 206) can be conjugated with the Gcc peptide (SEQ ID NO: 12) synthesized with a maleimide group on a PEG4 linker attached to the N-terminus via an NHS group. Gcc peptide with an N-terminal maleimide was synthesized and HPLC purified by Peptides International (Louisville, KY, USA). When the maleimide-Gcc antigen is added to the ferritin S111C particle, the maleimide conjugates to the free cysteine and forms a Gcc-NP that can be observed by Coomassie-stained SDS-PAGE gel. While the conjugation is typically 50% to 90% efficient (see FIG. 1A), a model of a Gcc peptide ferritin nanoparticle (100% conjugated) is shown in FIG. 1B.

2. In Vivo Characterization of Neutralizing Antibody Responses to RSV G Antigens To assess the in vivo response to RSV G antigens in mice, female BALBc mice were intramuscularly immunized with RSV antigens at specified doses at week 0, 3 and 6 with either a high dose (5 μg) or low dose (0.5 μg) of antigen. Unless otherwise noted, RSV antigens were adjuvanted with AF03 with a bedside mixing strategy. That is, 50 μl of the relevant polypeptide solution were mixed with 50 μl of Sanofi adjuvant AF03 (a squalene-based emulsion; see Klucker et al., J Pharm Sci. 2012 December; 101(12):4490-500) just prior to injection of 50 μl into each hind leg. No adverse effects from immunization were observed. Blood was collected 1 day prior to first immunization and at least 2 weeks after each injection (i.e. weeks 2, 5 and 8). Unless otherwise specified, data shown was for 2 weeks post third injection (week 8, also denoted as 2wp3). Typically, sera were analyzed from pre-immunized animals (denoted as naïve), two weeks post second injection (post-2 or 2wp2) or two weeks post third injection (post-3$^{rd}$ or 2wp3).

For the HAE neutralizing assay, serum was heat-inactivated for 30 minutes at 56° C. A fourfold serial dilution series of the inactivated serum was made in PneumaCult™-ALI Basal Medium (Stem Cell Technologies; 05002) supplemented with PneumaCult™-ALI 10× Supplement (Stem Cell Technologies; 05003) and 1% Antibiotic/Antimycotic (hence media). RSV viral stocks were combined 1:1 with the serum dilutions and incubated for 1.5 hours at 37° C. The virus-serum mixture was then added to 24 well plates containing fully differentiated HAE cells at 50 μL per well and incubated for 1 hour at 37° C., 5% $CO_2$. Following incubation, the inoculum was removed, the wells were washed twice with media to remove unbound virus and incubated a further 20 hours at 37° C., 5% $CO_2$. Infection events in cultures infected with RSV expressing the mKate (TagFP635) reporter were counted on a fluorescent microscope.

To detect infection with RSV not expressing the mKate reporter (RSV B strain neutralization), the pseudostratified epithelia were washed extensively with media to remove mucus then fixed with 4% paraformaldehyde for 30 minutes at room temperature, permeabilized with 0.25% Triton X-100 for 30 minutes, and blocked with DMEM supplemented with 2% FBS for 1 hour at 37° C. The blocking solution was replaced with 100 μL per well of Mouse Anti-RSV monoclonal Ab mixture (Millipore; MAB 858-4) diluted 1:200 in DMEM supplemented with 2% FBS, and the plates were incubated at 37° C. for 2 hours. The plates were then washed 3 times with PBS supplemented with 0.05% Tween 20. 100 μL of Goat anti-mouse IgG (H+L) (Invitrogen; A11001) diluted 1:200 in DMEM supplemented with 2% FBS was added per well, and the plates were incubated overnight at 4° C. Next morning, the plates were washed 3 times with PBS supplemented with 0.05% Tween 20, the florescent signal was stabilized with ProLong Gold AntiFade with DAPI (Thermo Fisher Scientific; P36935) and counted on a fluorescent microscope. The neutralizing antibody titers were determined at the 60% reduction endpoint.

3. In Vivo Characterization of Binding Antibody Responses to RSV G Antigens

For anti-Gcc binding, a trimerized dimer of Gcc peptide with a C-terminal HIS tag was used on an Octet tip similar to above. His$_6$-tagged Gcc (A2 strain) hexamer (SEQ ID NO: 7) or His$_6$-tagged Gcc (B1 strain) hexamer (SEQ ID NO: 8) was pre-loaded onto Anti-Penta-HIS (HIS1K) sensor tips (ForteBio #18-5122) for 400 seconds to allow capture to reach near saturation. Biosensor tips were then equilibrated for 90 seconds in Octet Wash Buffer, followed by diluted sera association for 300 seconds. Association curve final responses were measured using Octet Data Analysis HT10.0 software, and the response was multiplied by the dilution factor (100 or 300) to obtain the final reported response.

Figure 4A:
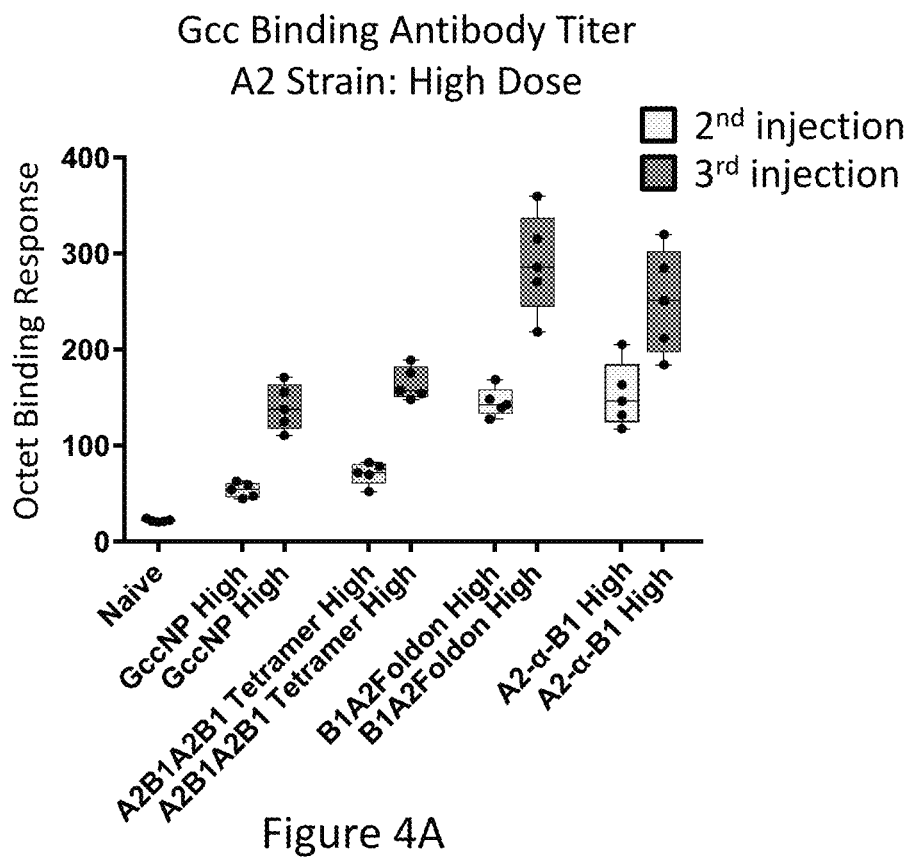
FIGS. 4A-B. RSV A2 strain antigen-binding antibody responses elicited by RSV G antigens.
Figure 4B:
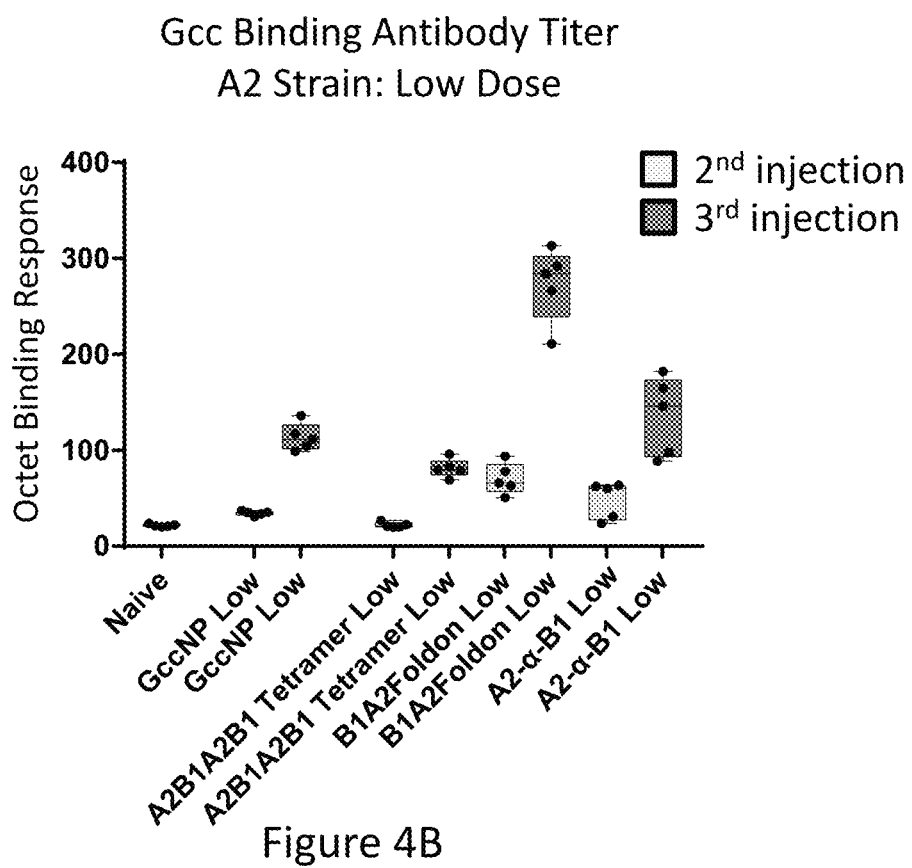

To determine if the RSV G antigens elicit a Gcc-binding immune response the sera from the immunizations above were tested for their ability to bind Gcc A2 hexamer (SEQ ID NO: 7) or Gcc B1 hexamer (SEQ ID NO: 8). The Gcc-binding response at high dose (FIG. 4A and FIG. 5A) and low dose (FIG. 4B and FIG. 5B) were tested at 2 weeks post-second and 2 weeks post-third immunizations. For both A2 strain (FIGS. 4A-B) and B1 strain (FIG. 5A-B), all antigens elicited a binding response relative to naïve mice sera. At all timepoints and doses, B1-A2-foldon elicited a superior binding response to Gcc A strain relative to Gcc tetramer or Gcc-NP. At each timepoint, high dose A2-α-B1 elicited binding response similar to high dose B1-A2-foldon, but at low dose A2-α-B1 elicited a reduced Gcc A strain-binding response relative to low dose B1-A2-foldon (FIG. 4A-B).

Figure 5A:
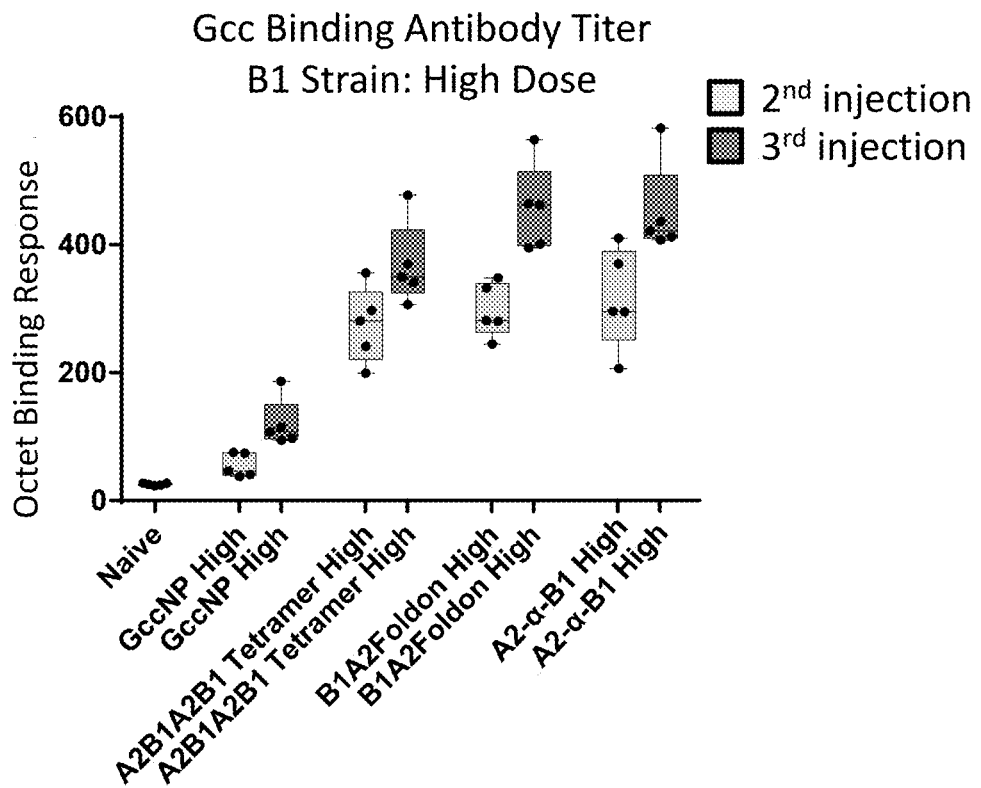
FIGS. 5A-B. RSV B1 strain antigen-binding antibody responses elicited by RSV G antigens.
Figure 5B:
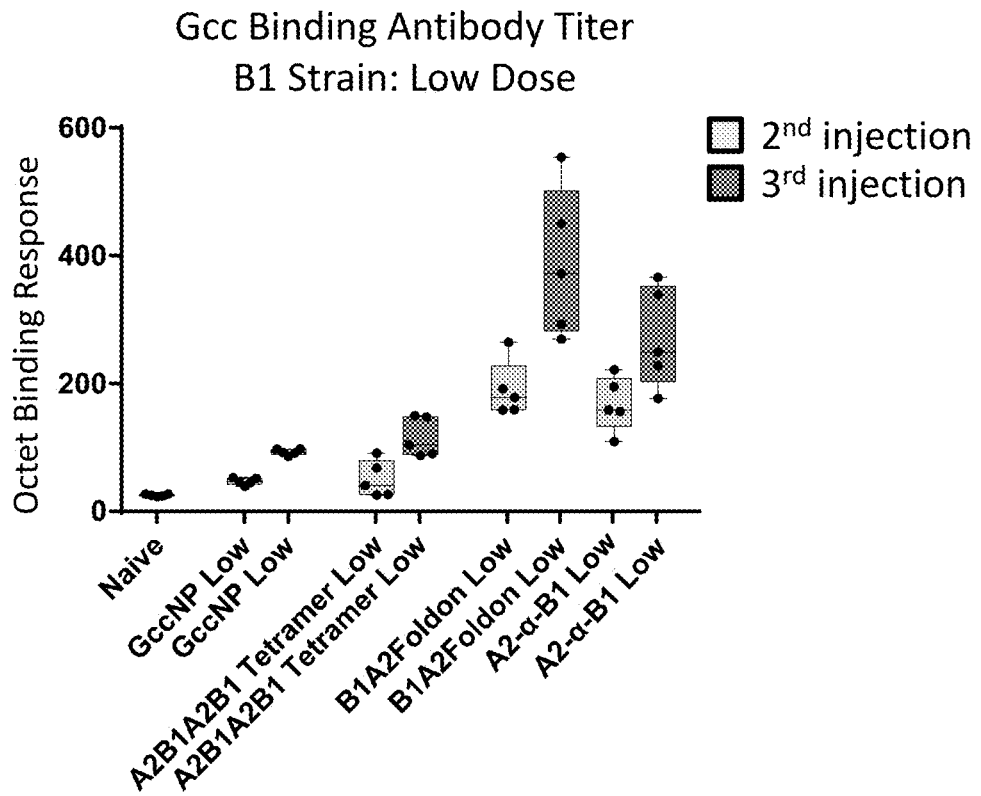
Figure 6A:
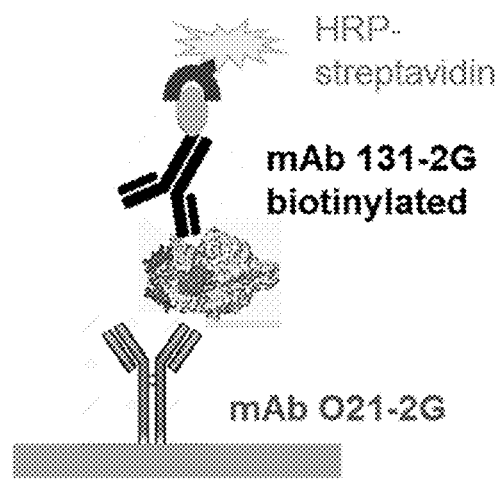
FIG. 6A is a schematic illustration of the antibody-binding experiment described in Example 5.
Figure 6B:
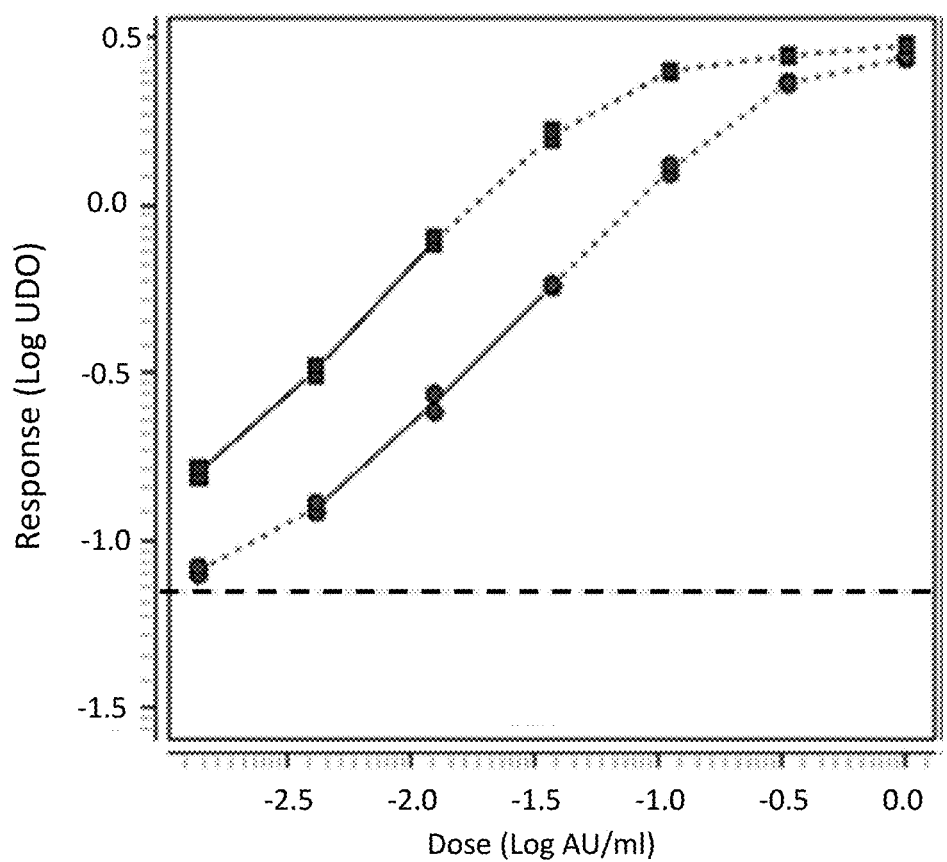
FIG. 6B shows results from the antibody-binding experiment described in Example 5 from the reference antigen (circles) and the construct of SEQ ID NO: 14 (squares). The dashed line indicates the baseline signal from blank wells. The units of the vertical and horizontal axes are Log OD units ($UDO$) and Log AU/mL, respectively (AU: arbitrary units).

At high dose at all timepoints, B1-A2-foldon, A1B2A1B2 tetramer and A2-α-B1 elicited a superior binding response to Gcc B strain relative to high dose Gcc-NP (FIG. 5A). At each timepoint, low dose A2-α-B1 and B1-A2-foldon elicited Gcc B1-binding superior to low dose Gcc-NP and A1B2A1B2 tetramer (FIG. 5B).

4. Response in Human Cells

To demonstrate the ability of the Pre-F-NP antigen and the Gcc-NP antigen to elicit a response in human cells, experiments are performed with the MIMIC platform. The MIMIC platform is comprised solely of autologous human immune cells capable of quickly and reproducibly generating antigen-specific innate and adaptive responses upon challenge. Previous work has demonstrated the ability of the MIMIC system to recapitulate in vivo immune profiles against such diverse targets as HBV, tetanus toxoid, monoclonal antibodies, YF-VAX, and influenza B-cell responses. To demonstrate Gcc-NP elicits a superior G antibody response than Gcc peptide alone, human cells are treated with Gcc peptide alone or Gcc peptide conjugated to nanoparticle (Gcc-NP) in human B-cells. Gcc-NP elicits a superior G-binding antibody response. Thus, it is expected that particles comprising Gcc epitopes will elicit immune responses in human immunization.

5. Characterization of Antibody Binding to Gcc Antigen

Antibody binding to a chimeric Gcc-foldon polypeptide having the sequence of SEQ ID NO: 14 was evaluated using a double sandwich ELISA (Enzyme Linked Immuno Sorbent Assay).

In the assay, RSV G glycoprotein was trapped between the capture antibody and the detection antibody. In this ELISA the detection antibody was labeled with biotin and the sandwich detected using enzyme-conjugated streptavidin (FIG. 6A).

To study whether the Gcc polypeptide had the proper conformation, the 021-2G Mab antibody (humanized purified anti-protein G monoclonal antibody, clone [021-2G], supplier RD Biotech) was used, which recognizes a conformational epitope of Gcc. Thus, 021-2G Mab binding indicates that the Gcc polypeptide is not misfolded or degraded. The detection antibody was purified anti-protein G monoclonal antibody (Mouse IgG1, kappa), clone [131-2G], Supplier: Sigma, ref: MAB 858-2-5, biotinylated using a biotinylation kit such as Lynx rapid plus biotin (typel) antibody conjugation kit biotin (typel) (Biorad ref LNK263B, LNK262B, or LNK261B) or Biotin EZ link sulfo NHS-LC-Biotin (Thermo Scientific ref 21327).

The results are shown in FIG. 6B, indicating that the chimeric Gcc-foldon polypeptide having the sequence of SEQ ID NO: 14 was recognized by both anti-protein G antibodies used, including clone [021-2G], which recognizes a conformational epitope of Gcc. This evidence is consistent with the conclusion that the chimeric Gcc-foldon polypeptide has a proper conformation for eliciting antibodies that will recognize native RSV.

Methods

To perform the assay, the following steps were performed:

Prepare a 021-2G coating antibody solution at 1 μg/ml in PBS 1×. Distribute 100 μL per well throughout a 96-well plate. Cover with plate sealer.

Incubate the sealed plate 16 h to 20 h at +5° C.±3° C. May be stored for up to 3 months at ≤−70° C. When the plates are thawed: drain and then proceed directly to saturation.

Defrost and empty plates. Distribute 200 μL/well of saturation buffer (1×PBS with 0.05% polysorbate 20 and 1% milk) throughout the plate. Cover with plate sealer. Place the plate in a plate incubator. Incubate at least 1 hour at approximately +37° C.

Perform 3 washes of the plate in Wash Buffer (1×PBS with 0.05% polysorbate 20 (Sigma P1379)).

All dilutions are realized with dilution buffer (1×PBS with 0.05% polysorbate 20 and 0.1% milk).

Foldon Gcc-His tag (non soluble fraction), supplier: BTL, was used as the reference antigen and internal control. Dilutions of the reference antigen and the internal control were made in independent duplicates from the same aliquot. The dilutions prepared for the reference antigen and the internal control were made in glass "Hemolysis" type test tube or in 4.5 mL plastic NUNC cryotubes.

Prepare a 2-fold dilution series of the reference, internal controls, and sample, each at 100 μL volume in a 96-well plate. Also prepare two blank wells containing dilution buffer only. Seal the plate with plate sealer. Place the plate in a plate incubator. Incubate for approximately 1 hour at approximately +37° C. Perform 3 washes in Wash Buffer.

Prepare a detection antibody solution at the appropriate concentration in dilution buffer. Distribute 100 μL/well of the detection antibody solution throughout the plate. Seal the plate with a plate sealer. Place the plate in a plate incubator. Incubate for approximately 1 hour at approximately +37° C. Perform 3 washes in Wash Buffer.

Prepare a solution of rabbit polyclonal anti-human IgG antibody coupled to peroxidase at the appropriate dilution buffer concentration. Distribute 100 µL/well of the conjugate solution throughout the plate. Seal the plate with a plate sealer. Place the plate in a plate incubator. Incubate for approximately 1 hour at approximately +37° C. Perform 3 washes in Wash Buffer.

Distribute 100 µL/well of TMB (ready-to-use 3,3',5,5'-Tetramethylbenzidine peroxidase substrate solution) throughout the plate. Incubate for approximately 10 min at room temperature and in the dark (e.g., wrapped in foil). Stop the reaction by adding 100 µL/well of 1N HCl solution. Read plates with a plate reader at 450 and 620 nm. Measure optical density (OD) expressed as the difference between the 2 readings to take into account the absorption of the plastic of the 96-well plate.

The calculation of relative activity is carried out by the method of parallel lines in an application respecting the formulas of the European Pharmacopoeia (paragraph 5.3.3: parallel line assays) and qualified by the ARD EU: PLA 2.0 (Parallel-Line Assays) or equivalent distributed by the company STEGMANN. The Log/Log model is used to calculate the relative activity in accordance with dose response law modeling.

We claim:

1. An antigenic RSV G polypeptide comprising more than two RSV G central conserved region (Gcc) monomers and a multimerization domain,
   wherein the polypeptide does not comprise ferritin and/or the polypeptide is a single chain polypeptide,
   wherein the more than two RSV Gcc monomers comprise RSV Gcc monomers of strain A and strain B,
   wherein the RSV Gcc of strain A comprises:
   a) the same sequence of amino acids as amino acids 2-42 of SEQ ID NO: 4, or
   b) the same sequence of amino acids as amino acids 151-193 of SEQ ID NO: 1;
   wherein the RSV Gcc of strain B comprises the same sequence of amino acids as amino acids 10-51 of SEQ ID NO: 8; and
   wherein the multimerization domain comprises the sequence of SEQ ID NOs: 9, 11, or 13.

2. The antigenic RSV G polypeptide of claim 1, comprising 3, 4, 5, 6, 7, 8, 9, or 10 Gcc monomers.

3. The antigenic RSV G polypeptide of claim 1, comprising more than two Gcc monomers of strain A or more than two Gcc monomers of strain B.

4. The antigenic RSV G polypeptide of claim 1, wherein the polypeptide is a trimer, tetramer, or hexamer.

5. The antigenic RSV G polypeptide of claim 1, comprising three Gcc monomers of strain A or three Gcc monomers of strain B.

6. The antigenic RSV G polypeptide of claim 1, comprising two Gcc monomers of strain A and two Gcc monomers of strain B, wherein the monomers of strain A and B alternate in order in a single chain.

7. The antigenic RSV G polypeptide of claim 1, wherein the antigenic RSV G polypeptide is capable of eliciting an immune response to RSV and/or protecting a subject against RSV infection.

8. The antigenic RSV G polypeptide of claim 1, comprising an amino acid sequence with 80%, 85%, 90%, 95%, 98%, 99%, or 100% identity to any one of SEQ ID NOs: 4, 6, or 14.

9. The antigenic RSV G polypeptide of claim 1, further comprising a linker separating the amino acid sequence of the RSV Gcc monomers of strain A and strain B and/or multimerization domain.

10. The antigenic RSV G polypeptide of claim 9, wherein the linker is a peptide linker.

11. An antigenic RSV G polypeptide comprising an amino acid sequence with at least 80% identity to any one of SEQ ID NOs: 4-8.

12. An antigenic RSV G polypeptide comprising an amino acid sequence with at least 80% identity to SEQ ID NO: 14.

13. A composition comprising the antigenic RSV G polypeptide of claim 1, further comprising a pharmaceutically acceptable carrier.

14. A method of eliciting an immune response to RSV or protecting a subject against RSV infection comprising administering the antigenic RSV G polypeptide or composition of claim 1 to a subject.

15. A nucleic acid encoding the antigenic RSV polypeptide of claim 1, optionally wherein the nucleic acid is an mRNA.

* * * * *